United States Patent
Yang et al.

(10) Patent No.: US 10,701,461 B2
(45) Date of Patent: *Jun. 30, 2020

(54) VIDEO PROCESSING METHOD, TERMINAL AND SERVER

(71) Applicant: Huawei Technologies Co., Ltd., Shenzhen (CN)

(72) Inventors: Xiaofeng Yang, Shenzhen (CN); Yuanyuan Zhang, Nanjing (CN); Teng Shi, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,150

(22) Filed: Dec. 11, 2018

(65) Prior Publication Data

US 2019/0110113 A1    Apr. 11, 2019

Related U.S. Application Data

(63) Continuation of application No. 15/243,098, filed on Aug. 22, 2016, now Pat. No. 10,171,888, which is a
(Continued)

(51) Int. Cl.
*H04N 21/23* (2011.01)
*H04N 21/854* (2011.01)
(Continued)

(52) U.S. Cl.
CPC . *H04N 21/85406* (2013.01); *H04N 21/23418* (2013.01); *H04N 21/23439* (2013.01);
(Continued)

(58) Field of Classification Search
None
See application file for complete search history.

(56) References Cited

U.S. PATENT DOCUMENTS

| 2009/0300692 A1 | 12/2009 | Mavlankar et al. |
| 2011/0082924 A1 | 4/2011 | Gopalakrishnan |
(Continued)

FOREIGN PATENT DOCUMENTS

| CN | 101035257 A | 9/2007 |
| CN | 102217313 A | 10/2011 |
(Continued)

OTHER PUBLICATIONS

Machine Translation and Abstract of Chinese Publication No. CN101035257, Sep. 12, 2007, 21 pages.
(Continued)

*Primary Examiner* — Cai Y Chen
(74) *Attorney, Agent, or Firm* — Conley Rose, P.C.

(57) ABSTRACT

A video processing method, a terminal, and a server, where the method includes receiving a media presentation description (MPD) file sent by the server, where the MPD file includes region information of a region that can be independently decoded in the video, determining, according to the region information, a region used for playback on a terminal from the region that can be independently decoded, determining a to-be-acquired media segment according to the MPD file, acquiring a location in which data content is stored in the media segment, acquiring, according to the location in which the data content is stored in the media segment, the data content from the media segment stored in the server, and playing a picture of the region for the playback on the terminal. Therefore, it is not required to independently store a partial video on the server, thereby saving a storage resource of the server.

20 Claims, 11 Drawing Sheets

Related U.S. Application Data continuation of application No. PCT/CN2014/072379, filed on Feb. 21, 2014.

(51) Int. Cl.

| | |
|---|---|
| *H04N 21/2343* | (2011.01) |
| *H04N 21/61* | (2011.01) |
| *H04N 21/6587* | (2011.01) |
| *H04N 21/845* | (2011.01) |
| *H04N 21/262* | (2011.01) |
| *H04N 21/4728* | (2011.01) |
| *H04N 21/234* | (2011.01) |
| *H04N 21/44* | (2011.01) |

(52) U.S. Cl.
CPC ............ *H04N 21/234363* (2013.01); *H04N 21/26258* (2013.01); *H04N 21/44008* (2013.01); *H04N 21/4728* (2013.01); *H04N 21/6125* (2013.01); *H04N 21/6587* (2013.01); *H04N 21/8455* (2013.01); *H04N 21/8456* (2013.01)

(56) References Cited

U.S. PATENT DOCUMENTS

| | | |
|---|---|---|
| 2012/0016965 A1 | 1/2012 | Chen et al. |
| 2012/0042335 A1 | 2/2012 | Hwang et al. |
| 2012/0169365 A1* | 7/2012 | Iwatsu ............... G01R 1/06783 324/750.24 |
| 2014/0089990 A1 | 3/2014 | Van Deventer et al. |
| 2016/0065640 A1 | 3/2016 | Luby et al. |

FOREIGN PATENT DOCUMENTS

| | | |
|---|---|---|
| CN | 102549999 A | 7/2012 |
| CN | 102986218 A | 3/2013 |
| CN | 103583050 A | 2/2014 |
| WO | 2012168365 A1 | 12/2012 |

OTHER PUBLICATIONS

Machine Translation and Abstract of Chinese Publication No. CN102217313, Oct. 12, 2011, 26 pages.
Machine Translation and Abstract of Chinese Publication No. CN103583050, Feb. 12, 2014, 30 pages.
"Informational technology—Dynamic adaptive streaming over HTTP (Dash)—Part 1 : Media presentation description and segment formats," XP030018824, ISO/IEC JTC1/SC 29, ISO/IEC 23009-1:2012(E), Jan. 5, 2012, 133 pages.
Foreign Communication From a Counterpart Application, European Application No. 14883016.9, Extended European Search Report dated Dec. 23, 2016, 14 pages.
Foreign Communication From a Counterpart Application, Chinese Application No. 2014800001163, Chinese Search Report dated Oct. 13, 2017, 2 pages.
Foreign Communication From a Counterpart Application, Chinese Application No. 2014800001163, Chinese Office Action dated Oct. 25, 2017, 6 pages.
Foreign Communication From a Counterpart Application, PCT Application No. PCT/CN2014/072379, English Translation of International Search Report dated Nov. 19, 2014, 2 pages.
Foreign Communication From a Counterpart Application, PCT Application No. PCT/CN2014/072379, English Translation of Written Opinion dated Nov. 19, 2014, 8 pages.

* cited by examiner

VIDEO PROCESSING METHOD, TERMINAL AND SERVER

CROSS-REFERENCE TO RELATED APPLICATIONS

This application is a continuation of U.S. patent application Ser. No. 15/243,098 filed on Aug. 22, 2016, which is a continuation application of international patent application number PCT/CN2014/072379 filed on Feb. 21, 2014. All of the afore-mentioned patent applications are hereby incorporated by reference in their entireties.

TECHNICAL FIELD

Embodiments of the present disclosure relate to the field of wireless communications, and in particular, to a video processing method, a terminal, and a server.

BACKGROUND

For a video using the High Efficiency Video Coding (HEVC) standard, there is a requirement for acquiring a regional picture from the video in a video playback process. For example, FIG. 1 is a schematic diagram of a scenario in which a regional picture in a video needs to be acquired. A European Cup match is shot using a panoramic shooting technology, and a shot panoramic video has a resolution of 6 kilo (K)×2K. The video with this resolution is suitable for playback on a panoramic display with an ultra-high resolution. If a user wants to view this panoramic video on a common screen, because of a low resolution of the common screen, a regional picture from the panoramic video needs to be acquired before the regional picture can be played on the common screen. As shown in FIG. 1, an upper part is a panoramic screen, and a lower part is a mobile phone screen and a computer screen. The panoramic screen can display a complete video picture, but neither the mobile phone screen nor the computer screen can display a complete panoramic video picture. Therefore, during playback on the mobile phone screen or the computer screen, a regional picture similar to that shown in a dashed block region in FIG. 1 needs to be acquired first, and then the regional picture is displayed on the mobile phone screen or the computer screen.

For another example, FIG. 2 is a schematic diagram of another scenario in which a regional picture in a video needs to be acquired. In video surveillance, pictures shot by multiple cameras may be spliced to form one surveillance video. During playback of the surveillance video, a user needs to acquire a regional picture of the surveillance video for playback if the user needs to specify a picture shot by one camera of the multiple cameras for playback. As shown in FIG. 2, a surveillance video is on the left side. Each image in the video includes pictures shot by multiple cameras. When it is assumed that a region identified by a dashed block is a regional picture specified by a user, the regional picture needs to be acquired for independent playback.

The HEVC introduces a concept of a region that can be independently decoded. The region that can be independently decoded may be a rectangular region in a video picture. Because video content within this region can be decoded independently, the user can independently request the video content in this region. Furthermore, as shown in FIG. 3, a region in a dashed block is the region that can be independently decoded. The user may request to play entire video content in a terminal screen, or may request to play video content only in the dashed block.

The Dynamic Adaptive Streaming over Hypertext Transfer Protocol (DASH) technology combines features of progressive downloading and playback in a conventional streaming technology and the HyperText Transfer Protocol (HTTP).

A DASH system may include a DASH server and a DASH terminal. The DASH server mainly stores two parts of content, media presentation description (MPD) and media. The MPD records media information such as a media segment address using the Extensible Markup Language (XML). The media may be media content such as a video or an audio. A video is used as an example. The video includes a media segment. Each media segment corresponds to a section of video content. Each media segment also corresponds to one segment address. The segment address is an HTTP network address and is also referred to as an acquiring address of the media segment. The DASH terminal may acquire the segment address by parsing the MPD, and acquire, from the DASH server using the acquired segment address, video content corresponding to the media segment.

In the prior art, to implement playback of a region in a video picture, a DASH server needs to independently store, in advance, content of a partial video of which a region needs to be played, that is, both content of the partial video and content of a panoramic video need to be stored independently in the DASH server. Consequently, the DASH server stores excessive redundant information, wasting a storage resource of the DASH server.

SUMMARY

Embodiments of the present disclosure provide a video processing method, a terminal, and a server in order to prevent a waste of a storage resource of a DASH server.

A first aspect of the embodiments of the present disclosure provides a video processing method, including sending, to a server, a request for acquiring an MPD file of a video, receiving the MPD file sent by the server, where the MPD file includes region information of a region that can be independently decoded in the video, determining, according to the region information, a region used for playback on the terminal from the region that can be independently decoded, determining a to-be-acquired media segment according to the MPD file, acquiring a location in which data content corresponding to the region for the playback on the terminal is stored in the media segment, acquiring, according to the location in which the data content corresponding to the region for the playback on the terminal is stored in the media segment, the data content corresponding to the region for the playback on the terminal from the media segment stored in the server, and playing, according to the data content corresponding to the region for the playback on the terminal, a picture of the region for the playback on the terminal.

With reference to the first aspect, in an implementation manner of the first aspect, the media segment includes at least two subsegments, and acquiring a location in which data content corresponding to the region for the playback on the terminal is stored in the media segment includes acquiring, from the server, a segment index and a subsample index of the media segment, where the segment index is used to indicate a location in which each subsegment included in the media segment is stored in the media segment, and the subsample index is used to indicate a location in which each subsample corresponding to the region that can be independently decoded is stored in each subsegment, determining a to-be-acquired subsegment according to the segment index, and determining, according to a location in which the subsegment is stored in the media segment and a location in which a subsample corresponding to the region for the playback on the terminal in the region that can be independently decoded is stored in the subsegment, the location in which the data content corresponding to the region for the playback on the terminal is stored in the media segment.

With reference to the first aspect or the foregoing implementation manner, in another implementation manner of the first aspect, the segment index and the subsample index are both located in a header of the media segment, and the subsample index is adjacent to the segment index, and acquiring, from the server, a segment index and a subsample index of the media segment includes acquiring, according to an address for acquiring the media segment, the segment index and the subsample index that are located in the header of the media segment.

With reference to the first aspect or the foregoing implementation manner, in another implementation manner of the first aspect, the media segment includes at least two sections, each section includes at least one subsegment, the segment index includes a first index and a second index, and a header of each section includes one second index and one subsample index adjacent to the second index. The first index is located in a header of the media segment and used to indicate a start location of each second index of the media segment in the media segment. The second index is used to indicate a location in which a subsegment of a section in which the second index is located is stored in the media segment, and acquiring, from the server, a segment index and a subsample index of the media segment includes acquiring, according to an address for acquiring the media segment, the first index located in the header of the media segment, and acquiring each second index and a subsample index adjacent to each second index according to the start location, indicated by the first index, of each second index in the media segment.

With reference to the first aspect or the foregoing implementation manner, in another implementation manner of the first aspect, the MPD file includes a correspondence between an address for acquiring the media segment and an address for acquiring an index segment, the index segment is dedicatedly used to store the segment index and the subsample index of the media segment, and in the index segment, the sub sample index is adjacent to the segment index, and acquiring, from the server, a segment index and a subsample index of the media segment includes acquiring, from the MPD file according to the correspondence between the address for acquiring the media segment and the address for acquiring the index segment, the address for acquiring the index segment corresponding to the address for acquiring the media segment, and acquiring the segment index and the subsample index according to the address for acquiring the index segment.

With reference to the first aspect or any one of the foregoing implementation manners, in another implementation manner of the first aspect, the MPD file includes a correspondence between the region for the playback on the terminal and the location in which the data content corresponding to the region for the playback on the terminal is stored in the media segment, and acquiring a location in which data content corresponding to the region for the playback on the terminal is stored in the media segment includes acquiring, from the MPD file according to the region for the playback on the terminal and the correspondence between the region for the playback on the terminal and the location in which the data content corresponding to the region for the playback on the terminal is stored in the media segment, the location in which the data content is stored in the media segment.

With reference to the first aspect or any one of the foregoing implementation manners, in another implementation manner of the first aspect, acquiring, according to the location in which the data content corresponding to the region for the playback on the terminal is stored in the media segment, the data content corresponding to the region for the playback on the terminal from the media segment stored in the server includes determining, according to the address for acquiring the media segment and the location in which the data content is stored in the media segment, an address, acquired from the MPD file, for acquiring the data content, where the address for acquiring the data content includes the address for acquiring the media segment and the location in which the data content is stored in the media segment, sending the address for acquiring the data content to the server, and receiving the data content that is sent by the server and corresponds to the address for acquiring the data content.

With reference to the first aspect or any one of the foregoing implementation manners, in another implementation manner of the first aspect, determining, according to the region information, a region used for playback on the terminal from the region that can be independently decoded includes presenting, to a user of the terminal according to the region information, the region that can be independently decoded, and determining, as the region for the playback on the terminal, a region selected by the user from the region that can be independently decoded, or determining, as the region for the playback on the terminal according to the region information, a region that matches a capability of the terminal and is in the region that can be independently decoded.

A second aspect of the embodiments of the present disclosure provides a video processing method, including sending an MPD file of a video to a terminal according to a request, sent by the terminal, for acquiring the MPD file of the video, where the MPD file includes region information of a region that can be independently decoded in the video, receiving a location, sent by the terminal, in which data content corresponding to a region used for playback on the terminal is stored in the media segment of the video, where the region for the playback on the terminal is determined by the terminal according to the region information and from the region that can be independently decoded, and sending, to the terminal according to the location in which the data content corresponding to the region for the playback on the terminal is stored in the media segment, the data content that is stored in the media segment and corresponds to the location in which the data content is stored in the media segment, where the data content corresponding to the region for the playback on the terminal is used for the terminal to play a picture of the region for the playback on the terminal.

With reference to a second aspect, in an implementation manner of the second aspect, the media segment includes at least two subsegments, and before receiving a location, sent by the terminal, in which data content corresponding to a region used for playback on the terminal is stored in the media segment of the video, the method further includes receiving acquiring information sent by the terminal, where the acquiring information is used for acquiring a segment index and a subsample index of the media segment, the segment index is used to indicate a location in which each subsegment included in the media segment is stored in the media segment, the subsample index is used to indicate a location in which each subsample corresponding to the region that can be independently decoded is stored in each subsegment, and the location in which each subsample corresponding to the region that can be independently decoded is stored in each subsegment and the location in which each subsegment is stored in the media segment are used to determine the location in which the data content corresponding to the region for the playback on the terminal is stored in the media segment, and sending the segment index and the subsample index to the terminal according to the acquiring information.

A third aspect of the embodiments of the present disclosure provides a terminal, including a sending unit configured to send, to a server, a request for acquiring an MPD file of a video, a receiving unit configured to receive the MPD file sent by the server, where the MPD file includes region information of a region that can be independently decoded in the video, a first determining unit configured to determine, according to the region information included in the MPD file received by the receiving unit, a region used for playback on the terminal from the region that can be independently decoded, a second determining unit configured to determine a to-be-acquired media segment according to the MPD file received by the receiving unit, a first acquiring unit configured to acquire a location in which data content corresponding to the region, determined by the first determining unit, for the playback on the terminal is stored in the media segment determined by the second determining unit, where the data content is used for the terminal to play a picture of the region for the playback on the terminal, a second acquiring unit configured to acquire, according to the location, acquired by the first acquiring unit, in which the data content corresponding to the region for the playback on the terminal is stored in the media segment, the data content corresponding to the region for the playback on the terminal from the media segment stored in the server, and a playback unit configured to play, according to the data content that is acquired by the second acquiring unit and corresponds to the region for the playback on the terminal, a picture of the region for the playback on the terminal.

With reference to the third aspect, in an implementation manner of the third aspect, the media segment includes at least two subsegments, and the first acquiring unit is further configured to acquire, from the server, a segment index and a subsample index of the media segment, where the segment index is used to indicate a location in which each subsegment included in the media segment is stored in the media segment, and the subsample index is used to indicate a location in which each subsample corresponding to the region that can be independently decoded is stored in each subsegment, determine a to-be-acquired subsegment according to the segment index, and determine, according to a location in which the subsegment is stored in the media segment and a location in which a subsample corresponding to the region for the playback on the terminal in the region that can be independently decoded is stored in the subsegment, the location in which the data content corresponding to the region for the playback on the terminal is stored in the media segment.

With reference to the third aspect or any one of the foregoing implementation manners, in another implementation manner of the third aspect, the segment index and the subsample index are both located in a header of the media segment, and the subsample index is adjacent to the segment index, and the first acquiring unit acquiring, from the server, a segment index and a subsample index of the media segment further includes acquiring, according to an address for acquiring the media segment, the segment index and the subsample index that are located in the header of the media segment.

With reference to the third aspect or any one of the foregoing implementation manners, in another implementation manner of the third aspect, the media segment includes at least two sections, each section includes at least one subsegment, the segment index includes a first index and a second index, and a header of each section includes one second index and one subsample index adjacent to the second index. The first index is located in a header of the media segment and used to indicate a start location of each second index of the media segment in the media segment. The second index is used to indicate a location in which a subsegment of a section in which the second index is located is stored in the media segment, and the first acquiring unit acquiring, from the server, a segment index and a subsample index of the media segment further includes acquiring, according to an address for acquiring the media segment, the first index located in the header of the media segment, and acquiring each second index and a subsample index adjacent to each second index according to the start location, indicated by the first index, of each second index in the media segment.

With reference to the third aspect or any one of the foregoing implementation manners, in another implementation manner of the third aspect, the MPD file includes a correspondence between an address for acquiring the media segment and an address for acquiring an index segment, the index segment is dedicatedly used to store the segment index and the subsample index of the media segment, and in the index segment, the subsample index is adjacent to the segment index, and the first acquiring unit acquiring, from the server, a segment index and a subsample index of the media segment further includes acquiring, from the MPD file according to the correspondence between the address for acquiring the media segment and the address for acquiring the index segment, the address for acquiring the index segment corresponding to the address for acquiring the media segment, and acquiring the segment index and the subsample index according to the address for acquiring the index segment.

With reference to the third aspect or any one of the foregoing implementation manners, in another implementation manner of the third aspect, the MPD file includes a correspondence between the region for the playback on the terminal and the location in which the data content corresponding to the region for the playback on the terminal is stored in the media segment, and the first acquiring unit acquiring, from the server, a segment index and a subsample index of the media segment further includes acquiring, from the MPD file according to the region for the playback on the terminal and the correspondence between the region for the playback on the terminal and the location in which the data content corresponding to the region for the playback on the terminal is stored in the media segment, the location in which the data content is stored in the media segment.

With reference to the third aspect or any one of the foregoing implementation manners, in another implementation manner of the third aspect, the second acquiring unit is further configured to determine, according to the address for acquiring the media segment and the location in which the data content is stored in the media segment, an address, acquired from the MPD file, for acquiring the data content, where the address for acquiring the data content includes the address for acquiring the media segment and the location in which the data content is stored in the media segment, send the address for acquiring the data content to the server, and receive the data content that is sent by the server and corresponds to the address for acquiring the data content.

With reference to the third aspect or any one of the foregoing implementation manners, in another implementation manner of the third aspect, the first determining unit is further configured to present, to a user of the terminal according to the region information, the region that can be independently decoded, and determine, as the region for the playback on the terminal, a region selected by the user from the region that can be independently decoded, or determine, as the region for the playback on the terminal according to the region information, a region that matches a capability of the terminal and is in the region that can be independently decoded.

According to a fourth aspect, a server is provided, including a receiving unit configured to receive a request, sent by a terminal, for acquiring an MPD file of a video, a storage unit configured to store the MPD file of the video, and a sending unit configured to send the MPD file, stored in the storage unit, of the video to the terminal according to the request, sent by the terminal, for the MPD file of the video, where the MPD file includes region information of a region that can be independently decoded in the video, where the receiving unit is further configured to receive a location, sent by the terminal, in which data content corresponding to a region used for playback on the terminal is stored in the media segment of the video, where the region for the playback on the terminal is determined by the terminal according to the region information and from the region that can be independently decoded. The storage unit is further configured to store the media segment of the video, and the sending unit is further configured to send, to the terminal according to the location, received by the receiving unit, in which the data content corresponding to the region for the playback on the terminal is stored in the media segment, the data content that is stored by the storage unit in the media segment and corresponds to the location in which the data content is stored in the media segment, where the data content corresponding to the region for the playback on the terminal is used for the terminal to play a picture of the region.

With reference to the fourth aspect, in an implementation manner of the fourth aspect, the media segment includes at least two subsegments, and the receiving unit is further configured to receive acquiring information sent by the terminal, where the acquiring information is used for acquiring a segment index and a subsample index of the media segment, the segment index is used to indicate a location in which each subsegment included in the media segment is stored in the media segment, the subsample index is used to indicate a location in which each subsample corresponding to the region that can be independently decoded is stored in each subsegment, and the location in which each subsample corresponding to the region that can be independently decoded is stored in each subsegment and the location in which each subsegment is stored in the media segment are used to determine the location in which the data content corresponding to the region for the playback on the terminal is stored in the media segment. The storage unit is further configured to store the segment index and the subsample index, and the sending unit is further configured to send the segment index and the subsample index to the terminal according to the acquiring information.

In the embodiments of the present disclosure, a location in which data content corresponding to a region for playback on a terminal is stored in a media segment is acquired, and the data content is acquired according to the storage location and from the media segment stored in a server. Therefore, it is not required to independently store content of a partial video on the server, thereby saving a storage resource of the server.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
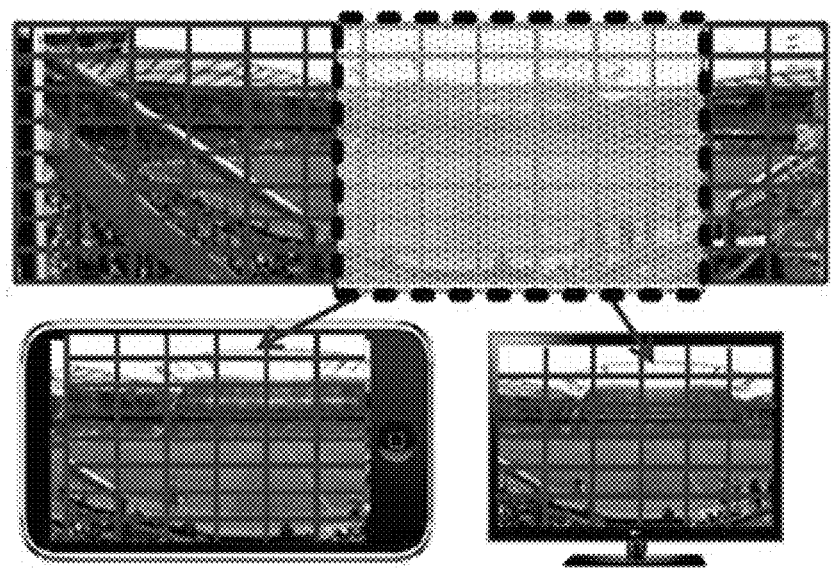
FIG. 1 is a schematic diagram of a scenario in which a regional picture in a video needs to be acquired.
Figure 2:
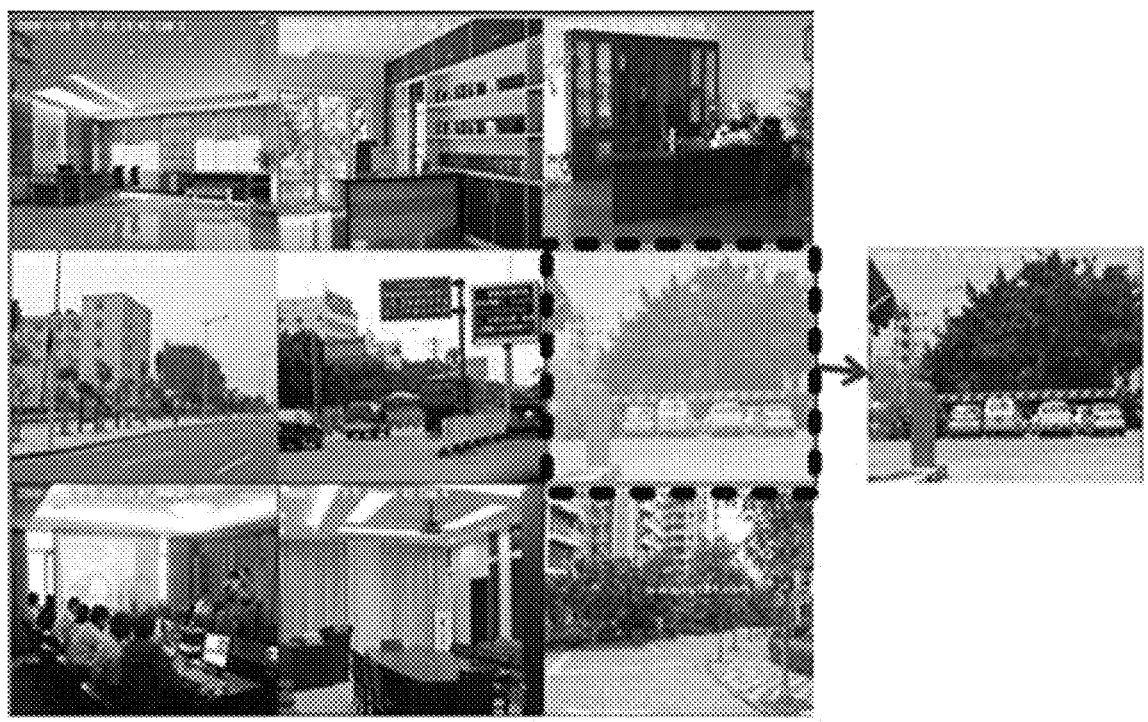
FIG. 2 is a schematic diagram of another scenario in which a regional picture in a video needs to be acquired.
Figure 3:
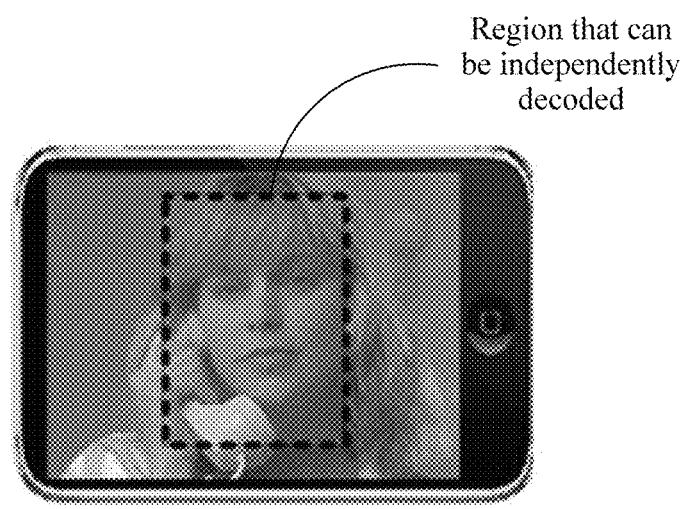
FIG. 3 is a diagram of an example of a region that can be independently decoded.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that, in a server (such as a DASH server), a video includes a media segment. A process in which a terminal acquires a video from the server is actually a process in which the terminal acquires media segments one by one from the server. That is, the terminal acquires media segments of the video one by one when the terminal needs to play a section of a video, thereby implementing progressive acquisition of the video.

The MPD file records an address for acquiring the media segments. The terminal may acquire, from the MPD file, an address for acquiring a media segment when the terminal needs to acquire the media segment of the video, and then acquire the media segment from the server according to the address for acquiring the media segment. It should be noted that, in the embodiments of the present disclosure, the address for acquiring the media segment may refer to an address at which the terminal may acquire content of the media segment. In the MPD file, the address for acquiring the media segment includes a base address of the video and an address at which the media segment is stored in the video. The following describes how to acquire the address for acquiring the media segment with reference to an example of a section of information recorded in an MPD file (hereinafter referred to as an MPD file 1).

MPD is described as follows:

```
<MPD>
...
<BaseURL>http://www.example.com/server/Segments/</Base URL>
...
<Representation id='R0' width='1920' height='1080' frameRate='30' bandwidth='256000'>
  <SegmentList duration='10'>
    <SegmentURL media='seg-full-1.mp4'/>
    <SegmentURL media='seg-full-2.mp4'/>
    ...
  </SegmentList>
</Representation>
...
</MPD>
```

In the MPD file 1, BaseURL is a base address of the video and it is http://www.example.com/server/Segments. One Representation represents a section of a video. SegmentList indicates a list of addresses at which media segments included in the video are stored in the video. SegmentURL media in the SegmentList indicates a storage address of the media segment. For example, in the foregoing program, 'seg-full-1.mp4'/> indicates that a storage address of a first media segment of the video is seg-full-1.mp4, and 'seg-full-2.mp4'/> indicates that a storage address of a second media segment of the video is seg-full-2.mp4.

An example in which the terminal needs to acquire the first media segment of the video is used for description. The terminal needs to acquire the base address, http://www.example.com/server/Segments, of the video from the MPD file 1 and the storage address: seg-full-1.mp4, of the first media segment. Then, according to the base address of the video and the storage address of the first media segment, the terminal acquires the following address for acquiring the first media segment: http://www.example.com/server/Segments/seg-full-1.mp4. That is, the address for acquiring the first media segment includes the base address of the video to which the first media segment belongs and the storage address of the first media segment. The terminal can download the first media segment from the server according to the address for acquiring the first media segment.

A section of a video may include one region that can be independently decoded, or may include multiple regions that can be independently and separately decoded. A quantity of regions that can be independently decoded and a division form of regions that can be independently decoded may be determined by a provider of the video.

It should be noted that the region that can be independently decoded may also be referred to as a motion constrained tile sets (MCTS). The tile set includes at least one tile. The tile is a concept at a coding layer. Each tile may correspond to one region in a video picture. Further, at the coding layer, a coded video includes a network abstraction layer (NAL) packet. One tile may corresponds to one or more NAL packets. From a perspective of the coding layer, a process of acquiring the region that can be independently decoded may be a process of downloading a NAL packet corresponding to each tile in the tile set.

In the prior art, the server stores not only panoramic content of a video, but also stores content of a partial video, which causes a waste of a storage resource of the server. An embodiment of the present disclosure provides a video processing method, which can avoid a waste of a storage resource of a server. A specific discussion is as follows.

Figure 4:
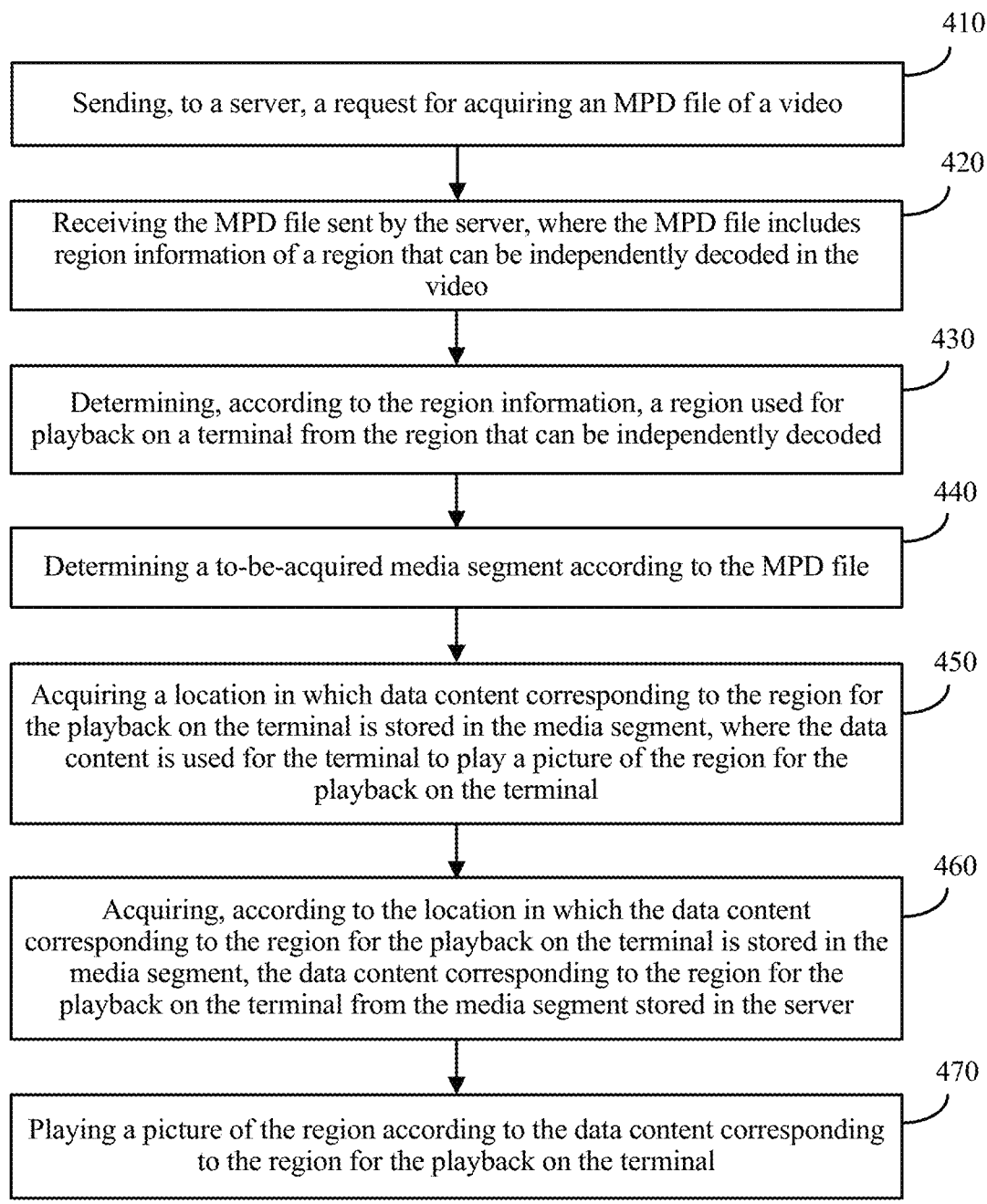
FIG. 4 is a schematic flowchart of a video processing method according to an embodiment of the present disclosure.

FIG. 4 is a schematic flowchart of a video processing method according to an embodiment of the present disclosure. The method may be performed by a terminal that plays a video. The method includes the following steps.

Step 410: Sending, to a server, a request for acquiring an MPD file of a video.

For example, the request may include an identifier of the MPD file. A specific process may refer to the prior art, and details are not described herein.

Step 420: Receiving the MPD file sent by the server, where the MPD file includes region information of a region that can be independently decoded in the video.

To enable a terminal to acquire the region that can be independently decoded in the video, the region information of the region that can be independently decoded may be included in the MPD file. The region information may include a region index number of the region that can be independently decoded, a location parameter of the region that can be independently decoded in an entire video picture, a frame rate during playback of the region that can be independently decoded and/or a transmission bandwidth of the region that can be independently decoded, or the like.

Step 430: Determining, according to the region information, a region used for playback on a terminal from the region that can be independently decoded.

Optionally, in an embodiment, the terminal may present, to a user of the terminal according to the region information of the region that can be independently decoded, the region that can be independently decoded, where the region information is included in the MPD file, and determine, as the region for the playback on the terminal, a region selected by the user from the region that can be independently decoded when implementing step 420. It should be understood that the region that can be independently decoded may be presented to the user of the terminal before playback of the video, or the region that can be independently decoded may be presented to the user according to a request of the user of the terminal in a playback process of the video.

Optionally, in another embodiment, the terminal may determine, as the region for the playback on the terminal according to the region information of the region that can be independently decoded, a region that matches a capability of the terminal and is in the region that can be independently decoded when implementing step 420, where the region information is included in the MPD file. For example, a resolution of each region of the region that can be independently decoded is recorded in the region information, and then a region that has a resolution closest to a resolution supported by the terminal from the resolution of each region is selected as the region for the playback on the terminal. For another example, a bandwidth required by each region of the region that can be independently decoded is recorded in the region information, and then a region that has a bandwidth closest to a current bandwidth of the terminal from the bandwidth required by each region is selected as the region for the playback on the terminal.

Step 440: Determining a to-be-acquired media segment according to the MPD file.

For example, to sequentially play a section of a video, the terminal may acquire, according to a sequence of media segments, addresses for acquiring media segments one by one from a segment list recorded in the MPD file. Alternatively, the terminal may calculate, according to duration of each media segment of the video, an address for acquiring a media segment corresponding to the middle moment when the terminal starts playback at a middle moment of a section of a video, where the duration is recorded in the MPD file. A specific process may follow the prior art, and details are not described herein.

Step 450: Acquiring a location in which data content corresponding to the region for the playback on the terminal is stored in the media segment, where the data content is used for terminal to play a picture of the region for the playback on the terminal.

It should be noted that the data content corresponding to the region for the playback on the terminal may further refer to data content required for playing a partial video in the region. That is, the data content is used for playing a picture of the region. That is, a video picture in the region is displayed on the terminal when the terminal downloads, from the media segment, and plays the data content corresponding to the region.

Optionally, the location in which the data content is stored in the media segment may be a byte range of the data content in the media segment. For example, a size of a media segment is 50,000 bytes, and the data content corresponding to the region for the playback on the terminal is located in the $10000^{th}$ to $15000^{th}$ bytes. Alternatively, the location in which the data content is stored in the media segment may also be a combination of an offset of a start location of the data content relative to a start location of the media segment and the size of the data content. For example, a media segment includes 50,000 bytes, and the data content corresponding to the region for the playback on the terminal starts from the $10000^{th}$ byte of the media segment and has a size of 5000 bytes. The foregoing is merely an example. This embodiment of the present disclosure imposes no specific limitation on the location in which the data content is stored in the media segment.

This embodiment of the present disclosure imposes no specific limitation on a manner of acquiring the location in which the data content is stored in the media segment. For example, the storage location may be recorded in the MPD file. Certainly, the storage location may also be recorded in the server, or the storage location may be indirectly acquired according to an indication of other index information. A subsequent embodiment describes in detail a specific manner of acquiring the storage location.

Step 460: Acquiring, according to the location in which the data content corresponding to the region for the playback on the terminal is stored in the media segment, the data content corresponding to the region for the playback on the terminal from the media segment stored in the server.

Furthermore, the terminal may acquire, from the MPD file, an address for acquiring the media segment. For example, the terminal acquires, based on the address for acquiring the media segment and the location in which the data content is stored in the media segment, the address for acquiring the data content. The address for acquiring the data content includes the address for acquiring the media segment and the location in which the data content is stored in the media segment. Further, the address for acquiring the data content is sent to the server, and the data content that is sent by the server and corresponds to the location in which the data content is stored in the media segment is received. For example, the address for acquiring the media segment is http://www.example.com/server/Segments/seg-full-1.mp4, and the location in which the data content is stored in the media segment is the $50^{th}$ to $1000^{th}$ bytes. Then, the address for acquiring the data content may be http://www.example.com/server/Segments/seg-full-1.mp4/50-1000. Therefore, the terminal can acquire the data content from the server by sending the address for acquiring the data content to the server.

Step 470: Playing a picture of the region according to the data content corresponding to the region for the playback on the terminal.

In this embodiment of the present disclosure, a location in which data content corresponding to a region for playback on a terminal is stored in a media segment is acquired, and the data content is acquired according to the storage location and from the media segment stored in a server. Therefore, it is not required to independently store a partial video on the server, thereby saving a storage resource of the server.

As described in step 420, the MPD file may record the region information of the region that can be independently decoded in the video. The following provides an example of an MPD file (hereinafter referred to as an MPD file 2) that records the region information. On the basis of the MPD file 1, the MPD file 2 has additional region information of the region that can be independently decoded, with the region index number of regionIdx='1', and the MPD file 2 may be:

```
<MPD>
    ...
    <BaseURL>http://www.example.com/server/Segments/</Base URL>
    ...
    <!-Description of full-frame video-->
        <AdaptationSet    id="FV"  mimeType='video/mp4' codecs='hev1'>
            <Representation id='R0' width='1920' height='1080' frameRate='30' bandwidth='256000'>
                <SegmentList duration='10'>
                <SegmentURL media='seg-full-1.mp4'/>
                <SegmentURL media='seg-full-2.mp4'/>
                ...
                </SegmentList>
            </Representation>
            <Representation id="R1" parentRepID='R0' regionIdx='1' pos='400,100', width='320' height='480' frameRate='30' bandwidth='64000'>
                <SegmentList duration='10'>
                <Segment URL media='seg-full-1.mp4'/>
                <SegmentURL media='seg-full-2.mp4'/>
                ...
                </SegmentList>
            </Representation>
        </AdaptationSet>
    ...
    </Period>
    </MPD>.
```

Furthermore, BaseURL indicates a base address of the video. Representation with id='R0' does not include the region index number (regionIdx) of the region that can be independently decoded is not included, and therefore may be considered as information about an entire video picture. Representation with id="R1" includes regionIdx='1', and therefore information included therein corresponds to region information of the region that can be independently decoded with the region index number of 1.

Representation with regionIdx='1' includes the following information: parentRepID='R0': This region that can be independently decoded belongs to a region in Representation with id="R0". That is, the Representation with id="R0" represents information about the entire video picture, and the Representation with id="R1" represents a region that can be independently decoded and is identified as R1 in a video picture identified as R0. regionIdx='1': A region index number of a region that can be independently decoded. pos='400,100', width='320', and height='480': location parameters of a region that can be independently decoded in the entire video picture. pos='400,100' represents a pixel location on the top left corner of a region that can be independently decoded, and width='320' and height='480' respectively represents a width and a height of a region that can be independently decoded. Finally frameRate='30' and bandwidth='64000': a frame rate and a bandwidth of a region that can be independently decoded.

In addition, the Representation with id="R1" may also include a SegmentList. An address, recorded in the SegmentList, in which the media segment is stored in the video may be the same as an address, recorded in the SegmentList in the Representation with id='R0', in which the media segment is stored in the video.

In the MPD file 2, the region information of the region that can be independently decoded is recorded in a form of Representation, which can be compatible with a manner of recording video information in an existing MPD.

It should be noted that the MPD file 2 is merely an example. In practice, the region information of the region that can be independently decoded may also be recorded in another form in an MPD file. For example, a new recording manner different from Representation is dedicatedly defined for the region that can be independently decoded.

In the prior art, a media segment may be further divided into subsegments, and a subsegment includes at least one sample (one sample is one photo, or is referred to as one frame of a picture). In this way, progressive downloading of the media segment performed by a terminal may be by progressive downloading of video subsegments. It can be learned from the foregoing description that the MPD file records an address for acquiring the media segment. To implement the progressive downloading of the media segment, the terminal needs to acquire, from the MPD file, only the address for acquiring the media segment. Likewise, to further implement the progressive downloading of the video subsegments, the terminal needs to acquire only an address for acquiring the subsegments.

In the prior art, the server stores a segment index. The segment index may include a location in which each subsegment of the media segment is stored in the media segment. To implement progressive downloading of a subsegment, the terminal needs to first download a segment index from the server and then download the subsegment according to the segment index.

It should be noted that one photo or one frame of a video picture corresponds to one sample. One subsample may refer to a section of data content that is in one sample and belongs to one region that can be independently decoded. One sample may include N subsamples if a video picture is divided into N regions that can be independently decoded. That is, a subsample corresponding to a region needs to be acquired from a media segment if data content corresponding to the region for playback on the terminal needs to be acquired from the media segment.

An embodiment of the present disclosure introduces a subsample index on the basis of the segment index. A location in which the data content corresponding to the region for the playback on the terminal is stored in the media segment is jointly indicated by the segment index and the subsample index. A specific procedure is shown in FIG. 5.

Figure 5:
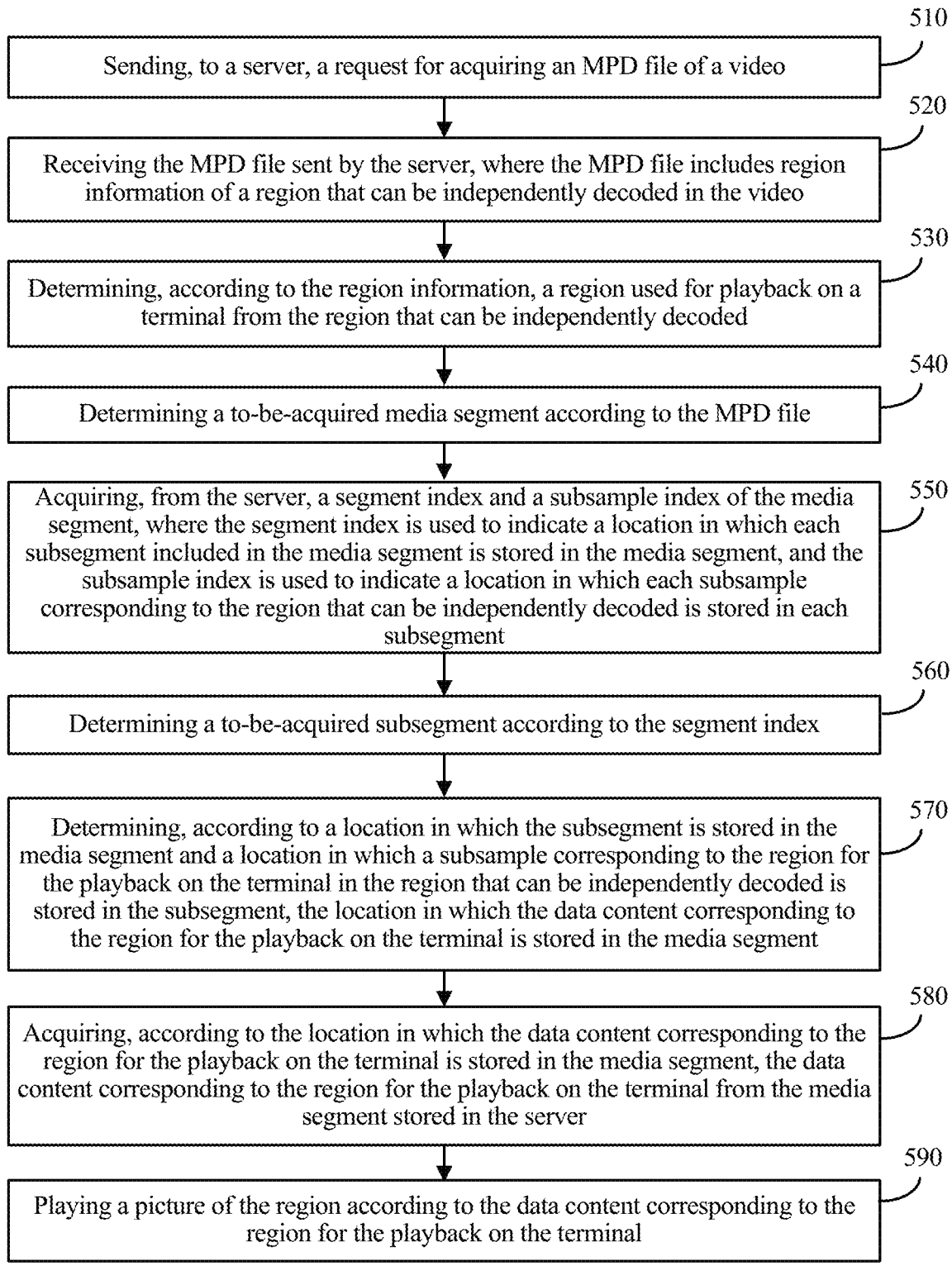
FIG. 5 is a schematic flowchart of a video processing method according to an embodiment of the present disclosure.

FIG. 5 is a schematic flowchart of a video processing method according to an embodiment of the present disclosure. The method in FIG. 5 may be performed by a terminal that plays a video. Steps 510, 520, 530, 540, 580, and 590 are respectively the same as steps 410, 420, 430, 440, 460, and 470 in FIG. 4, and details are not described herein.

Step 510: Sending, to a server, a request for acquiring an MPD file of a video.

Step 520: Receiving the MPD file sent by the server, where the MPD file includes region information of a region that can be independently decoded in the video.

Step 530: Determining, according to the region information, a region used for playback on a terminal from the region that can be independently decoded.

Step 540: Determining a to-be-acquired media segment according to the MPD file.

The media segment may include at least two subsegments.

Step 550: Acquiring, from the server, a segment index and a subsample index of the media segment, where the segment index is used to indicate a location in which each subsegment included in the media segment is stored in the media segment, and the subsample index is used to indicate a location in which each subsample corresponding to the region that can be independently decoded is stored in each subsegment.

It should be understood that the subsample may be a section of data content in the subsegment, and in the subsegment, data content corresponding to the region for the playback on the terminal may include a subsample corresponding to the region.

It should be noted that the subsample index may include a location in which a subsample included in each subsegment in the media segment is stored in each subsegment, and a region that can be independently decoded and corresponds to the subsample included in each subsegment in the media segment.

Furthermore, the subsample index may be defined using a Box structure. The following provides an example of a structure of a subsample index of a media segment.

```
aligned(8) class SubsampleIndexBox extends FullBox('spix', 0, 0) {
unsigned int(32)   subsegment_count;
for (i=1; i <= subsegment_count; i++)
{
unsigned int(32)   subsample_count;
for (j=1; j <= subsample_count; j++) {
unsigned int(8) region_index;
unsigned int(24) byte_offset;
unsigned int(24) subsample_size;
}
}
}
```

In the structure of the subsample index 'spix' refer to subsample index, subsegment_count indicates a quantity of subsegments included in the media segment, subsample_count indicates a quantity of subsamples in a subsegment i of the media segment, region_index is a region index number of a region that can be independently decoded and corresponds to a subsample j in the subsegment i. byte_offset is an offset of a start location of the subsample j in the subsegment i relative to the subsegment i. subsample_size is a size of the subsample j in the subsegment i. Therefore, byte_offset and subsample_size can jointly indicate a location in which the subsample j in the subsegment i is stored in the subsegment i. The location in which a subsample included in each subsegment in the media segment is stored in each subsegment and the region that can be independently decoded and corresponds to the subsample may be acquired from the subsample index by means of traversal.

Step 560: Determining a to-be-acquired subsegment according to the segment index.

The to-be-acquired subsegment may be determined according to the segment index in a manner in the prior art, and details are not described herein.

Step 570: Determining, according to a location in which the subsegment is stored in the media segment and a location in which a subsample corresponding to the region for the playback on the terminal in the region that can be independently decoded is stored in the subsegment, the location in which the data content corresponding to the region for the playback on the terminal is stored in the media segment.

Furthermore, step 570 may include acquiring, according to a location in which the subsample corresponding to the region that can be independently decoded is stored in the subsegment, the location in which the subsample corresponding to the region for the playback on the terminal is stored in the subsegment, adding a start location of the location in which the subsegment is stored in the media segment and start and end locations of the location in which the subsample corresponding to the region for the playback on the terminal is stored in the subsegment in order to determine a start location of the subsample corresponding to the region for the playback on the terminal in the media segment such that a location in which the subsample corresponding to the region for the playback on the terminal is stored in the media segment is further acquired according to the location in which the subsample corresponding to the region for the playback on the terminal is stored in the subsegment. The location in which the subsample corresponding to the region for the playback on the terminal is stored in the media segment may be considered as the location in which the data content corresponding to the region for the playback on the terminal is stored in the media segment.

For example, if the location in which the subsegment is stored in the media segment is from 1000 to 10000, and the location in which the subsample corresponding to the region for the playback on the terminal is stored in the subsegment is from 0 to 500, it can be obtained by calculation that the location in which the subsample corresponding to the region for the playback on the terminal is stored in the media segment is from 1000 to 1500.

Optionally, in an embodiment, the subsample index may also directly indicate the location in which the data content corresponding to the region for the playback on the terminal is stored in the media segment. In this case, step 570 may be replaced with the following. Acquiring, from the subsample index, a location in which the data content is stored in the media segment.

Step 580: Acquiring, according to the location in which the data content corresponding to the region for the playback on the terminal is stored in the media segment, the data content corresponding to the region for the playback on the terminal from the media segment stored in the server.

Step 590: Playing a picture of the region according to the data content corresponding to the region for the playback on the terminal.

In this embodiment of the present disclosure, a subsample index is introduced on the basis of an existing segment index, and a location in which data content corresponding to a region for playback on a terminal is stored in a media segment is jointly indicated based on the segment index and the subsample index such that the terminal may download the data content from the server according to the location in which the data content is stored in the media segment, and display video content corresponding to the region for the playback on the terminal.

Figure 6:
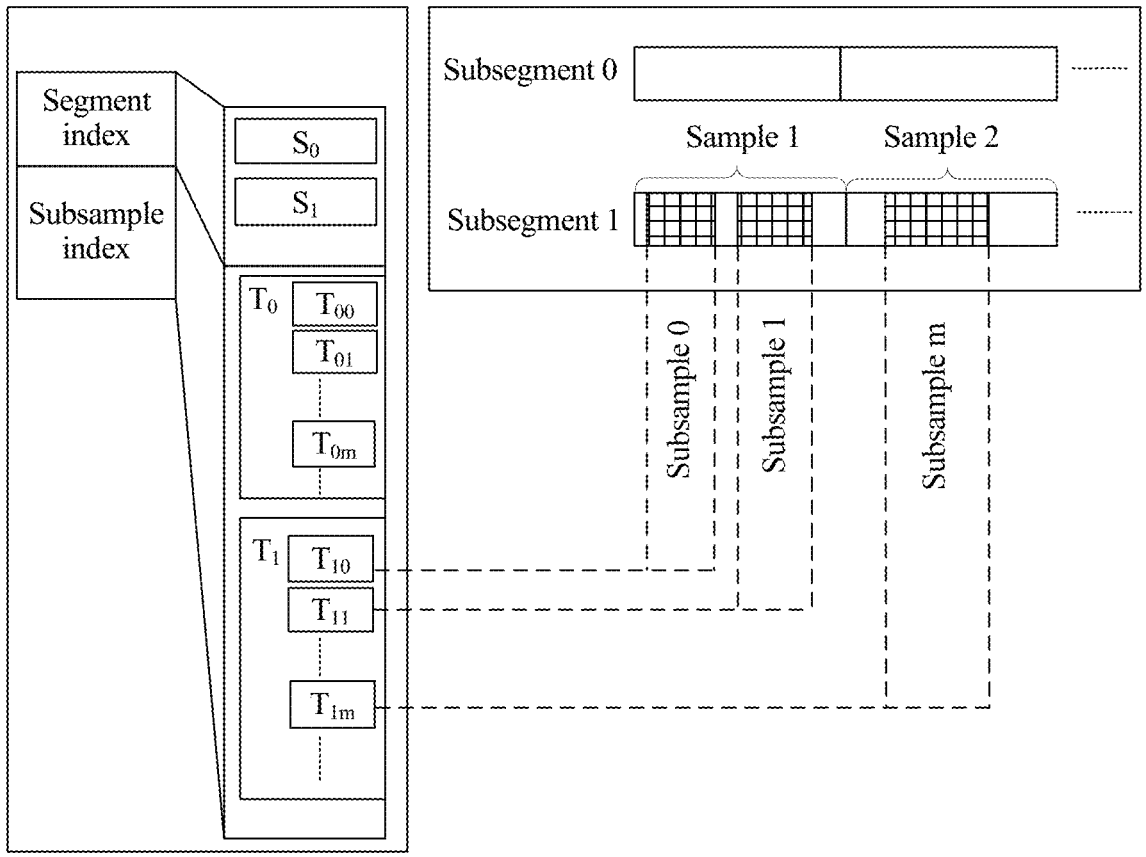
FIG. 6 is a schematic structural diagram of a segment index and a subsegment index.

FIG. 6 is a schematic structural diagram of a segment index and a subsegment index. A media segment in FIG. 6 includes two subsegments, a subsegment 0 and a subsegment 1. Segment indexes of the media segment include a segment index $S_0$ of the subsegment 0 and a segment index $S_1$ of the subsegment 1, where $S_0$ and $S_1$ record locations in which the subsegment 0 and the subsegment 1 are stored in the media segment respectively. Subsample indexes include $T_0$ and $T_1$, where $T_0$ records a location in which each subsample included in the subsegment 0 is stored in the subsegment 0 and a region that can be independently decoded and corresponds to each subsample included in the subsegment 0, and $T_1$ records a location in which each subsample included in the subsegment 1 is stored in the subsegment 1 and a region that can be independently decoded and corresponds to each subsample included in the subsegment 1. $T_0$ includes $T_{00}, T_{01}, T_{0m}$, and the like, where $T_{00}, T_{01}$, and $T_{0m}$ respectively record locations in which a subsample 0, a subsample 1, and a subsample m in the subsegment 0 are stored in the subsegment 0 and their corresponding regions that can be independently decoded. $T_1$ includes $T_{10}, T_{11}, T_{1m}$, and the like, where $T_{10}, T_{11}$, and $T_{1m}$ respectively record locations in which a subsample 0, a subsample 1, and a subsample m in the subsegment 1 are stored in the subsegment 1 and their corresponding regions that can be independently decoded. It can be also learned from FIG. 6 that a subsample may be a section of data content in a sample. For example, the subsample 0 and the subsample 1 are both a section of data content in a sample 1 in the subsegment 1, and the subsample m is a section of data content in a sample 2 in the subsegment 1.

In step 550, the terminal acquires, from the server, a segment index and a subsample index of the media segment. In the prior art, the segment index may be stored in the server in the following three manners. Correspondingly, the subsample index may also be stored in three manners. A specific description is as follows.

Manner 1: The segment index may be located in a header of the media segment. That is, content of the media segment includes a segment index of the media segment and video content corresponding to the media segment, where the segment index of the media segment is stored in a header of the media segment. Furthermore, the manner in which server acquires the segment index of the media segment may include that the terminal downloads first N bytes of which the first address is an address for acquiring the media segment, where the first N bytes include a parameter of a quantity M of bytes that is used to indicate a size of the segment index, acquires, from content of the downloaded N bytes, the quantity M of bytes that is used to indicate the size of the segment index, determines, according to a relationship between M and N, whether the segment index is downloaded completely, acquires the segment index from the content of the downloaded N bytes when M is less than N, or downloads the $(N+1)^{th}$ to $M^{th}$ bytes of the media segment from the server according to the address for acquiring the media segment when M is greater than N. As an example, in an existing box structure, four bytes of start content of the media segment shows a size of a box of the segment index. The terminal may download 1K bytes of the media segment from the server and acquire the size of the segment index from the 1K bytes. The segment index can be acquired from the 1K bytes when the size of the segment index is less than the 1K bytes, and the terminal continues to download remaining bytes of the segment index from the server when the size of the segment index is greater than the 1K bytes. For example, when it is assumed that the size of the segment index is 900 bytes, the segment index can be acquired by extracting the $0^{th}$ to $900^{th}$ bytes from the previous 1K bytes, and when it is assumed that the size of the segment index is 1050 bytes, the complete segment index can be acquired by continuing to download the $1001^{st}$ to $1050^{th}$ bytes from the server.

Figure 7:
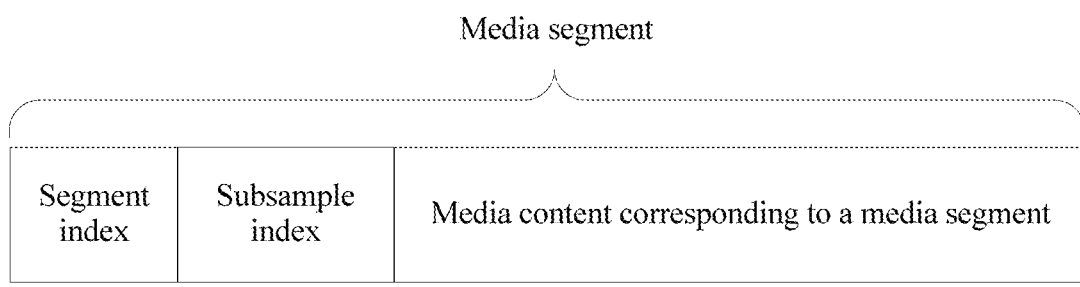
FIG. 7 is a schematic diagram of distribution locations of a segment index and a subsample index.

On the basis of manner 1, in an embodiment, the content of the media segment may further include a subsample index. Referring to FIG. 7, a segment index and a subsample index precede media content corresponding to the media segment, and the subsample index follows the segment index. That is, the segment index and the subsample index are both located in a header of the media segment, and the subsample index is adjacent to the segment index. Therefore, step 550 may include acquiring, according to an address for acquiring the media segment, the segment index and the subsample index that are located in the header of the media segment. It should be noted that the subsample index is adjacent to the segment index may refer to that the segment index and the subsample index are located in a segment of consecutive addresses. For example, the segment index is located from the $0^{th}$ byte to the $1000^{th}$ byte and the subsample index is located from the $1001^{st}$ byte to the $2000^{th}$ byte. A manner of downloading the subsample index and a manner of downloading the segment index are both based on a box structure. Furthermore, acquiring, according to an address for acquiring the media segment, the segment index and the subsample index that are located in the header of the media segment may include downloading first N bytes of which the first address is the address for acquiring the media segment, where the first N bytes include a parameter of a quantity M of bytes that is used to indicate a size of the segment index, acquiring, from content of the downloaded N bytes, the quantity M of bytes that is used to indicate the size of the segment index, determining, according to a relationship between M and N, whether the segment index is downloaded completely, acquiring the segment index from the content of the downloaded N bytes when M is less than N, and downloading the $(N+1)^{th}$ to $M^{th}$ bytes of content of the media segment from the server according to the address for acquiring the media segment when M is greater than or equal to N, downloading first T bytes that begin with the $(M+1)^{th}$ byte of the media segment, where the first T bytes include a parameter of a quantity Q of bytes that is used to indicate a size of the subsample index, acquiring, from content of the downloaded T bytes, the quantity Q of bytes that is used to indicate the size of the subsample index, determining, according to a relationship between T and Q, whether the subsample index is downloaded completely, acquiring the subsample index from the content of the downloaded T bytes when Q is less than T, and downloading the $(T+1)^{th}$ to $Q^{th}$ bytes of content of the media segment from the server according to the address for acquiring the media segment when Q is greater than or equal to T.

Manner 2: The media segment includes at least two sections, where each section includes at least one subsegment. The segment index includes a first index and a second index. A header of each section includes one second index and one subsample index adjacent to the second index. The first index is located in a header of the media segment and used to indicate a start location of each second index of the media segment in the media segment. The second index is used to indicate a location in which a subsegment of a section in which the second index is located is stored in the media segment.

Therefore, for manner 2, step 550 may include acquiring, according to an address for acquiring the media segment, the first index located in the header of the media segment, and acquiring each second index and a subsample index adjacent to each second index according to the start location, indicated by the first index, of each second index in the media segment. Furthermore, the first index, the second index, and the subsample index all can use the box structure. Downloading, according to an address for acquiring the media segment, the first index located in the header of the media segment may include downloading first $N_1$ bytes of which the first address is the address for acquiring the media segment, where the first $N_1$ bytes include a parameter of a quantity $M_1$ of bytes that is used to indicate a size of the first index, acquiring, from content of the downloaded $N_1$ bytes, the quantity $M_1$ of bytes that is used to indicate the size of the segment index, determining, according to a relationship between $M_1$ and $N_1$, whether the first index is downloaded completely, acquiring the first index from the content of the downloaded $N_1$ bytes when $M_1$ is less than $N_1$, and downloading the $(N_1+1)^{th}$ to $M_{ith}$ bytes of content of the media segment from the server according to the address for acquiring the media segment when $M_1$ is greater than or equal to $N_1$. After a start location of each second index in the media segment is found, a manner of downloading each second index and a subsample index corresponding to each second index is the same as a manner of downloading a segment index and a subsample index in manner 1, and details are not described herein.

Figure 8:
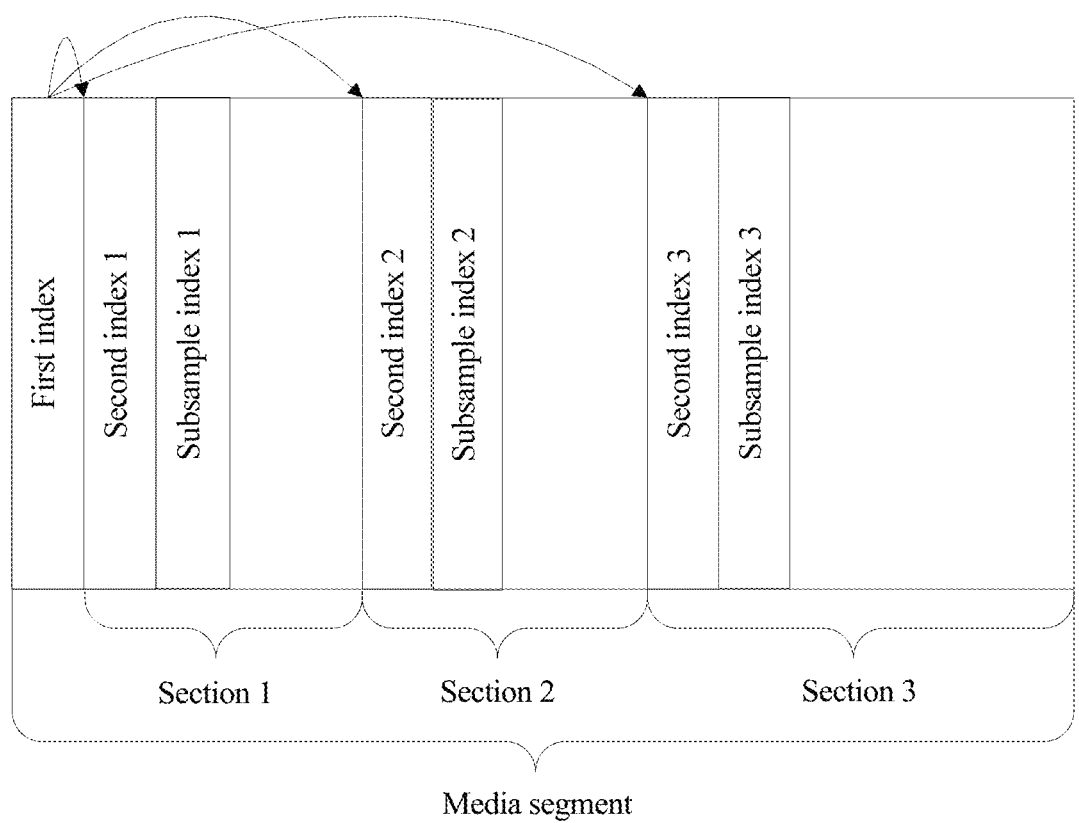
FIG. 8 is another schematic diagram of distribution locations of a segment index and a subsample index.

As an example, a media segment in FIG. 8 is divided into three sections, where a first index is located in a header of the media segment. A second index 1, a second index 2, and a second index 3 are respectively located in headers of a section 1, a section 2, and a section 3. The second index 1 indicates a location in which a subsegment in the section 1 is stored in the media segment, the second index 2 indicates a location in which a subsegment in the section 2 is stored in the media segment, and the second index 3 indicates a location in which a subsegment in the section 3 is stored in the media segment. Subsample indexes 1 to 3 correspond to the second indexes 1 to 3 respectively and are adjacent to the second indexes 1 to 3 respectively. The subsample index 1 indicates a location in which a subsample in the section 1 is located in a subsegment to which the subsample belongs. The subsample index 2 indicates a location in which a subsample in the section 2 is located in a subsegment to which the subsample belongs. The subsample index 3 indicates a location in which a subsample in the section 3 is located in a subsegment to which the subsample belongs. During actual downloading, the terminal first downloads the first index, separately finds start locations of the second indexes 1 to 3 according to an indication of the first index, and then separately downloads the second indexes and the subsample indexes of the section 1 to the section 3.

Manner 3: The segment index of the media segment is located in an index segment of the media segment. The index segment herein is dedicatedly used to store the segment index of the media segment. In this manner, the MPD file may record a correspondence between an address for acquiring the media segment and an address for acquiring the index segment. The address for acquiring an index segment corresponding to a media segment is first found from the MPD file when the segment index of the media segment needs to be downloaded, and then the segment index may be downloaded using the box structure.

On the basis of manner 3, a subsample index is added to the index segment. The index segment is dedicatedly used to store the segment index and the subsample index of the media segment. The segment index and the subsample index are located in the index segment, and the subsample index is adjacent to the segment index. Step 550 may include acquiring, according to an address for acquiring the index segment, the segment index and the subsample index that are located in the index segment. Furthermore, acquiring, according to an address for acquiring the index segment, the segment index and the subsample index that are located in a header of the index segment may include downloading first N bytes of the index segment according to the address for acquiring the index segment, where the first N bytes include a parameter of a quantity M of bytes that is used to indicate a size of the segment index, acquiring, from content of the downloaded N bytes, the quantity M of bytes that is used to indicate the size of the segment index, determining, according to a relationship between M and N, whether the segment index is downloaded completely, acquiring the segment index from the content of the downloaded N bytes when M is less than N, downloading the $(N+1)^{th}$ to $M^{th}$ bytes of content of the index segment from the server according to the address for acquiring the index segment when M is greater than or equal to N, downloading first T bytes that begin with the $(M+1)^{th}$ byte of the index segment, where the first T bytes include a parameter of a quantity Q of bytes that is used to indicate a size of the subsample index, acquiring, from content of the downloaded T bytes, the quantity Q of bytes that is used to indicate the size of the subsample index, determining, according to a relationship between T and Q, whether the subsample index is downloaded completely, acquiring the subsample index from the content of the downloaded T bytes when Q is less than T, or downloading the $(T+1)^{th}$ to $Q^{th}$ bytes of content of the index segment from the server according to the address for acquiring the index segment when Q is greater than or equal to T.

It should be noted that the terminal may make an agreement with the server in advance on a manner, among the foregoing three manners, of storing the segment index and the subsample index. Further, the terminal may first determine a manner of storing the segment index and the subsample index and then download the segment index and the subsample index. The terminal first parses an MPD file, and determines that manner 3 is to be used by the server to store the segment index when a correspondence between an address for acquiring a media segment and an address for acquiring an index segment is recorded in the MPD file. The terminal may use the following procedure to determine whether manner 1 or manner 2 is used by the server to store the segment index when a correspondence between an address for acquiring a media segment and an address for acquiring an index segment is not recorded in the MPD file. First N bytes of which the first address is an address for acquiring the media segment are downloaded, where the first N bytes include a parameter that is used to indicate a manner of storing a segment index, and the parameter is used to indicate whether the segment index and the subsample index of the media segment are both stored in a header of the media segment (corresponding to manner 1) or distributed in different sections of the media segment (corresponding to manner 2). The parameter is acquired from the downloaded N bytes, and the manner of storing the segment index of the media segment is determined according to an indication of the parameter. For example, the parameter is reference type, first N bytes of the media segment are downloaded, and a value of reference type is acquired from the downloaded N bytes. The server stores the segment index of the media segment in manner 2 if reference type=1, or the server stores the segment index of the media segment in manner 1 if reference type is not equal to 1.

In the foregoing description, a location in which the data content corresponding to the region for the playback on the terminal is stored in the media segment is jointly indicated by the segment index and the subsample index. However, this embodiment of the present disclosure is not limited thereto. Furthermore, the location in which the data content corresponding to the region for the playback on the terminal is stored in the media segment may be directly recorded in the MPD file, and a correspondence between the region for the playback on the terminal and the location in which the data content corresponding to the region is stored in the media segment is recorded in the MPD file. For details, refer to FIG. 9.

Figure 9:
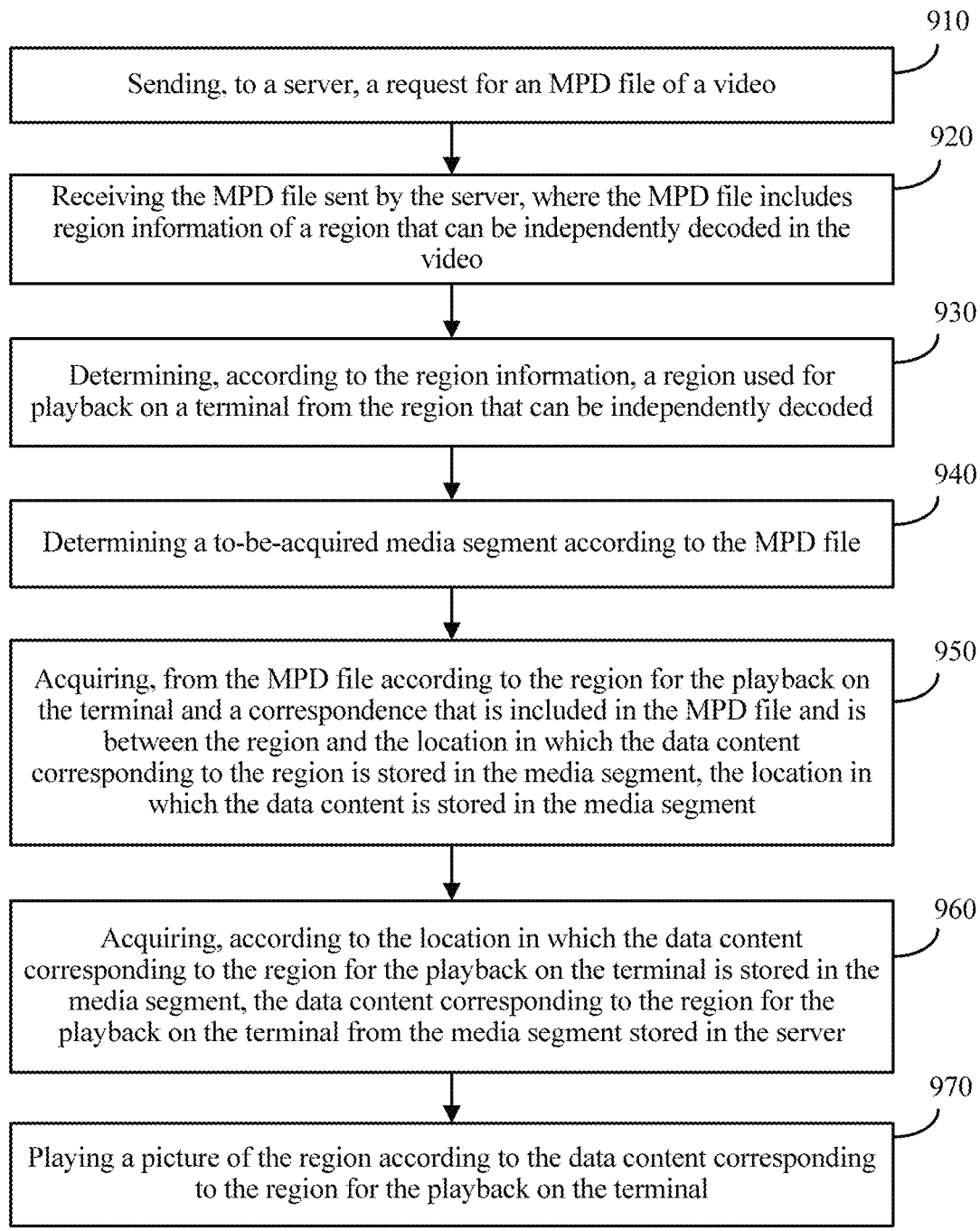
FIG. 9 is a schematic flowchart of a video processing method according to an embodiment of the present disclosure.

FIG. 9 is a schematic flowchart of a video processing method according to an embodiment of the present disclosure. The method in FIG. 9 may be performed by a terminal that plays a video. Steps 910, 920, 930, 940, 960, and 970 of the method in FIG. 9 are same as the steps 410, 420, 430, 440, 460, and 470 in FIG. 4 respectively, and details are not described herein.

Step 910: Sending, to a server, a request for acquiring an MPD file of a video.

Step 920: Receiving the MPD file sent by the server, where the MPD file includes region information of a region that can be independently decoded in the video.

Step 930: Determining, according to the region information, a region used for playback on a terminal from the region that can be independently decoded.

Step 940: Determining a to-be-acquired media segment according to the MPD file.

Step 950: Acquiring, from the MPD file according to the region for the playback on the terminal and a correspondence that is included in the MPD file and is between the region and the location in which the data content corresponding to the region is stored in the media segment, the location in which the data content is stored in the media segment.

The following provides an example of an MPD file (hereinafter referred to as an MPD file 3) that records a location in which data content corresponding to a region that can be independently decoded is stored in the media segment.

```
<MPD>
...
<BaseURL>http://www.example.com/
server/Segments/</BaseURL>
...
<Representation id="R1"
parentRepID='R0' regionIdx='1' pos='0,0', width='960' height='540'
frameRate='30' bandwidth='64000'>
```

```
<SegmentList duration='10'>
<Segment URL media='seg-full-1.mp4'/>
<region range='0,12000'>
<region range='28000,35000'>
...
</SegmentList>
</Representation>
...
</MPD>
```

In the MPD file 3, the region range indicates a byte range of the data content that is in the media segment (hereinafter referred to as a media segment A) corresponding to 'seg-full-1.mp4' and corresponds to a region, whose regionIdx (region index number) is 1, (hereinafter referred to as a region 1) that can be independently decoded. That is, the terminal needs to find, from the MPD file 3, a correspondence between the region 1 and the byte range of the data content corresponding to the region 1 in the media segment A if the terminal needs to acquire a location in which the data content corresponding to the region 1 is stored in the media segment A, and then acquire the region range corresponding to the media segment A. It should be noted that, in the MPD file 3, a location in which data content corresponding to a region that can be independently decoded is stored in a media segment is indicated by a byte range, but this embodiment of the present disclosure is not limited thereto. For example, a location in which data content is stored in a media segment may also be indicated by means of combining a size of the data content and an offset between a start location of the data content and a start location of the media segment.

Step 960: Acquiring, according to the location in which the data content corresponding to the region for the playback on the terminal is stored in the media segment, the data content corresponding to the region for the playback on the terminal from the media segment stored in the server.

Furthermore, when it is assumed that the MPD file records an address for acquiring the media segment: http://www.example.com/server/Segments/seg-full-1.mp4, the following location in which the data content corresponding to the region for the playback on the terminal is stored in the media segment is acquired by performing step 940, region range='0,12000' and region range='28000,35000'. To acquire the data content, the terminal needs to download only the data content from the server using addresses http://www.example.com/server/Segments/seg-full-1.mp4/0-12000 and http://www.example.com/server/Segments/seg-full-1.mp4/28000-35000.

Step 970: Playing a picture of the region according to the data content corresponding to the region for the playback on the terminal.

In this embodiment of the present disclosure, a location in which data content corresponding to a region for playback on the terminal is stored in a media segment is stored in an MPD file such that the data content corresponding to the region can be flexibly downloaded from a server according to the storage location, an objective of acquiring a partial video without additional storage of the partial video on the server is achieved, and a storage resource of the server is saved.

The foregoing describes in detail the video processing methods in the embodiments of the present disclosure from a perspective of a terminal. The following describes a video processing method in an embodiment of the present disclosure from a perspective of a server.

It should be understood that interaction between a terminal and a server, related features, functions, and the like that are described on the server side correspond to descriptions on the terminal side. For brevity, a repeated description is omitted appropriately.

Figure 10:
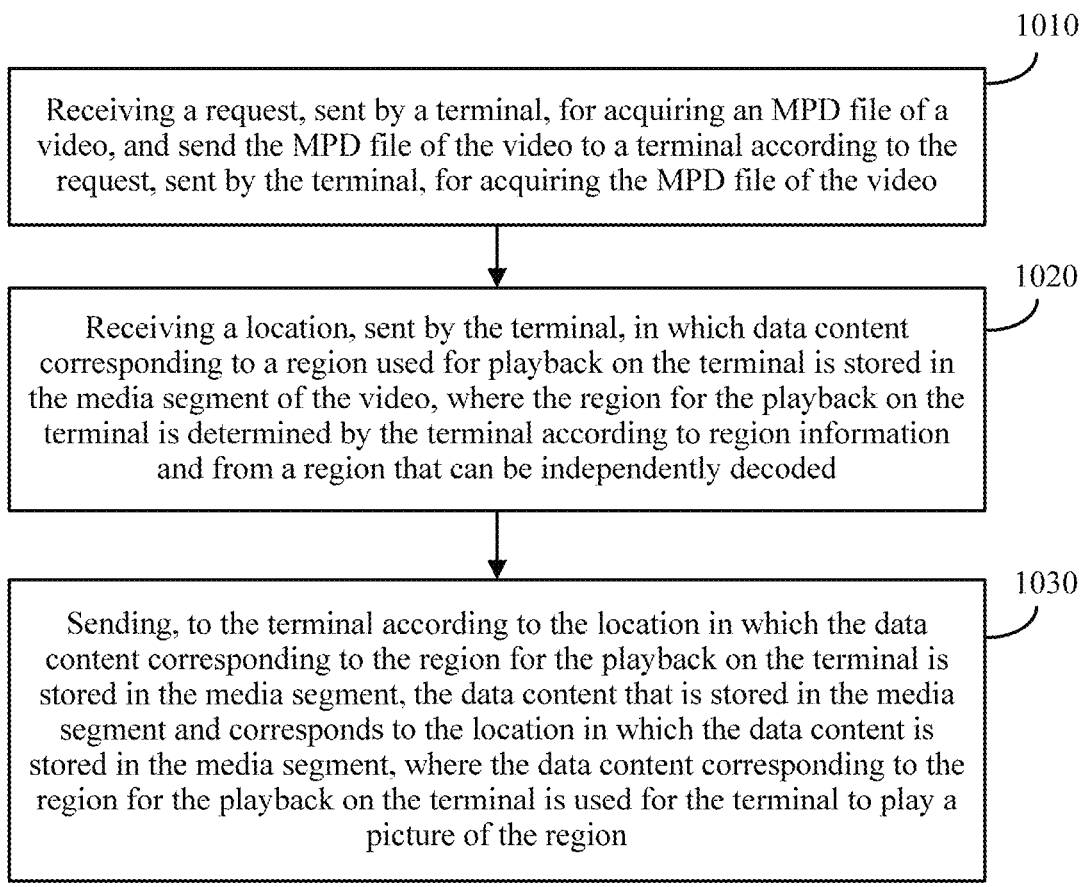
FIG. 10 is a schematic flowchart of a video processing method according to an embodiment of the present disclosure.

FIG. 10 is a schematic flowchart of a video processing method according to an embodiment of the present disclosure. The method in FIG. 10 may be performed by a server. The method in FIG. 10 includes the following steps.

Step 1010: Receiving a request, sent by a terminal, for acquiring an MPD file of a video, and send the MPD file of the video to a terminal according to the request, sent by the terminal, for acquiring the MPD file of the video, where the MPD file includes region information of a region that can be independently decoded in the video.

Step 1020: Receiving a location, sent by the terminal, in which data content corresponding to a region used for playback on the terminal is stored in the media segment of the video, where the region for the playback on the terminal is determined by the terminal according to the region information and from the region that can be independently decoded.

Step 1030: Sending, to the terminal according to the location in which the data content corresponding to the region for the playback on the terminal is stored in the media segment, the data content that is stored in the media segment and corresponds to the location in which the data content is stored in the media segment, where the data content corresponding to the region for the playback on the terminal is used for the terminal to play a picture of the region.

In this embodiment of the present disclosure, a location in which data content corresponding to a region for playback on a terminal is stored in a media segment is acquired, and the data content is downloaded according to the storage location and from content of the media segment stored in a server. Therefore, it is not required to independently store a partial video on the server, thereby saving a storage resource of the server.

Optionally, in an embodiment, before receiving a location, sent by the terminal, in which data content corresponding to a region used for playback on the terminal is stored in the media segment of the video, the method in FIG. 10 may further include receiving acquiring information sent by the terminal, where the acquiring information is used for acquiring a segment index and a subsample index of the media segment, the segment index is used to indicate a location in which each subsegment included in the media segment is stored in the media segment, the subsample index is used to indicate a location in which each subsample corresponding to the region that can be independently decoded is stored in each subsegment, and the location in which each subsample corresponding to the region that can be independently decoded is stored in each subsegment and the location in which each subsegment is stored in the media segment are used to determine the location in which the data content corresponding to the region for the playback on the terminal is stored in the media segment, and sending the segment index and the subsample index to the terminal according to the acquiring information.

Optionally, in another embodiment, the segment index and the subsample index are both located in a header of the media segment, the subsample index is adjacent to the segment index, and the segment index and the subsample index are acquired from the server.

Optionally, in another embodiment, the media segment includes at least two sections, each section includes at least one subsegment, the segment index includes a first index and a second index, and a header of each section includes one second index and one subsample index adjacent to the second index. The first index is located in a header of the media segment and used to indicate a start location of each second index of the media segment in the media segment, and the second index is used to indicate a location in which a subsegment of a section in which the second index is located is stored in the media segment.

Optionally, in another embodiment, the MPD file includes a correspondence between an address for acquiring the media segment and an address for acquiring an index segment, the index segment is dedicatedly used to store the segment index and the subsample index of the media segment, and in the index segment, the subsample index is adjacent to the segment index.

Optionally, in another embodiment, the MPD file includes a correspondence between the region for the playback on the terminal and the location in which the data content corresponding to the region is stored in the media segment.

It should be noted that the server in FIG. 10 may perform any action performed by a server in FIG. 4 to FIG. 9.

The foregoing describes in detail the video processing methods in the embodiments of the present disclosure with reference to FIG. 1 to FIG. 10. The following describes in detail a terminal and a server in embodiments of the present disclosure with reference to FIG. 11 to FIG. 14.

Figure 11:
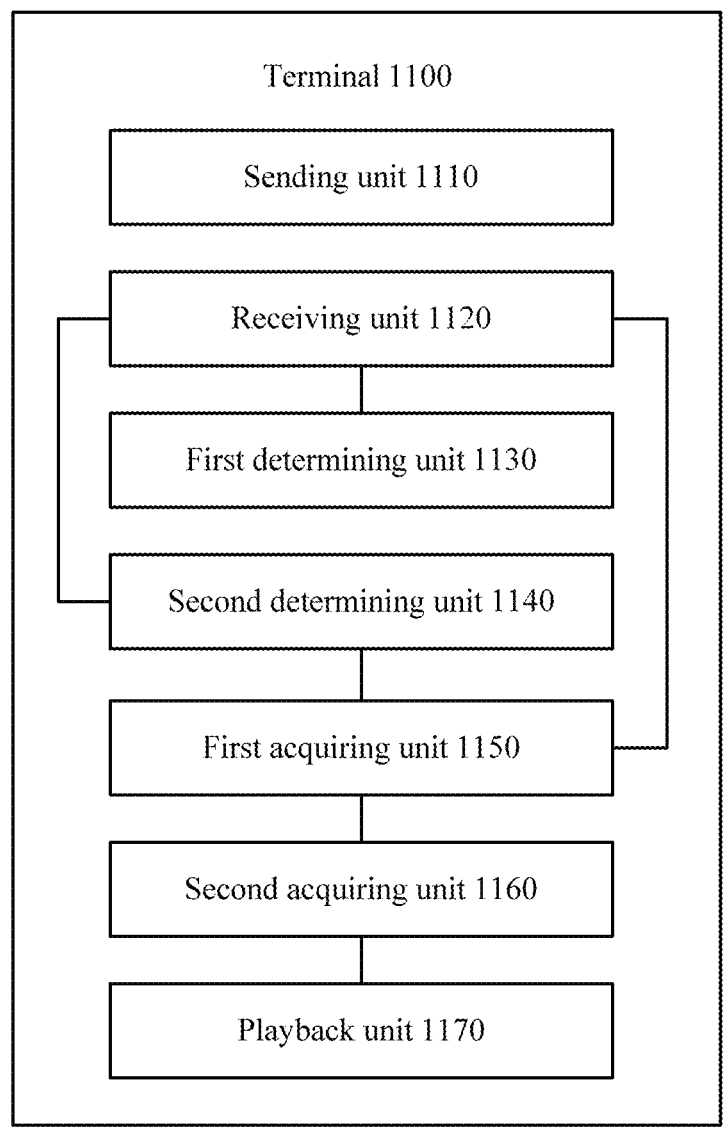
FIG. 11 is a schematic block diagram of a terminal according to an embodiment of the present disclosure.

FIG. 11 is a schematic block diagram of a terminal according to an embodiment of the present disclosure. The terminal 1100 in FIG. 11 includes a sending unit 1110, a receiving unit 1120, a first determining unit 1130, a second determining unit 1140, a first acquiring unit 1150, a second acquiring unit 1160, and a playback unit 1170. It should be noted that the terminal 1100 can implement steps performed by a terminal in FIG. 1 to FIG. 10, and to avoid repetition, a repeated description is omitted appropriately.

The sending unit 1110 is configured to send, to a server, a request for acquiring an MPD file of a video.

The receiving unit 1120 is configured to receive the MPD file sent by the server, where the MPD file includes region information of a region that can be independently decoded in the video.

The first determining unit 1130 is configured to determine, according to the region information included in the MPD file received by the receiving unit 1120, a region used for playback on the terminal 1100 from the region that can be independently decoded.

The second determining unit 1140 is configured to determine a to-be-acquired media segment according to the MPD file received by the receiving unit 1120.

The first acquiring unit 1150 is configured to acquire a location in which data content corresponding to the region, determined by the first determining unit 1130, for the playback on the terminal 1100 is stored in the media segment determined by the second determining unit 1140, where the data content is used for playing a picture of the region.

The second acquiring unit 1160 is configured to acquire, according to the location, acquired by the first acquiring unit 1150, in which the data content corresponding to the region for the playback on the terminal 1100 is stored in the media segment, the data content corresponding to the region for the playback on the terminal 1100 from the media segment stored in the server.

The playback unit 1170 is configured to play, according to the data content that is acquired by the second acquiring unit 1160 and corresponds to the region for the playback on the terminal 1100, a picture of the region for the playback on the terminal 1100.

In this embodiment of the present disclosure, a location in which data content corresponding to a region for playback on a terminal is stored in a media segment is acquired, and the data content is acquired according to the storage location and from the media segment stored in a server. Therefore, it is not required to independently store a partial video on the server, thereby saving a storage resource of the server.

Optionally, in an embodiment, the media segment includes at least two subsegments, and the first acquiring unit 1150 is further configured to acquire, from the server, a segment index and a subsample index of the media segment, where the segment index is used to indicate a location in which each subsegment included in the media segment is stored in the media segment, and the subsample index is used to indicate a location in which each subsample corresponding to the region that can be independently decoded is stored in each subsegment, determine a to-be-acquired subsegment according to the segment index, and determine, according to a location in which the subsegment is stored in the media segment and a location in which a subsample corresponding to the region for the playback on the terminal 1100 in the region that can be independently decoded is stored in the subsegment, the location in which the data content corresponding to the region for the playback on the terminal 1100 is stored in the media segment.

Optionally, in another embodiment, the segment index and the subsample index are both located in a header of the media segment, and the subsample index is adjacent to the segment index, and the first acquiring unit 1150 acquiring, from the server, a segment index and a subsample index of the media segment further includes acquiring, according to an address for acquiring the media segment, the segment index and the subsample index that are located in the header of the media segment.

Optionally, in another embodiment, the media segment includes at least two sections, each section includes at least one subsegment, the segment index includes a first index and a second index, and a header of each section includes one second index and one subsample index adjacent to the second index. The first index is located in a header of the media segment and used to indicate a start location of each second index of the media segment in the media segment. The second index is used to indicate a location in which a subsegment of a section in which the second index is located is stored in the media segment, and the first acquiring unit 1150 acquiring, from the server, a segment index and a subsample index of the media segment further includes acquiring, according to an address for acquiring the media segment, the first index located in the header of the media segment, and acquiring each second index and a subsample index adjacent to each second index according to the start location, indicated by the first index, of each second index in the media segment.

Optionally, in another embodiment, the MPD file includes a correspondence between the address for acquiring a media segment and an address for acquiring an index segment, the index segment is dedicatedly used to store the segment index and the subsample index of the media segment, and in the index segment, the sub sample index is adjacent to the segment index, and the first acquiring unit 1150 acquiring, from the server, a segment index and a subsample index of the media segment further includes acquiring, from the MPD file according to the correspondence between the address for acquiring the media segment and the address for acquiring the index segment, the address for acquiring the index segment corresponding to the address for acquiring the media segment, and acquiring the segment index and the subsample index according to the address for acquiring the index segment.

Optionally, in another embodiment, the MPD file includes a correspondence between the region for the playback on the terminal 1100 and the location in which the data content corresponding to the region for the playback on the terminal 1100 is stored in the media segment, and the first acquiring unit 1150 acquires, from the server, a segment index and a subsample index of the media segment further includes acquiring, from the MPD file according to the region for the playback on the terminal 1100 and the correspondence between the region for the playback on the terminal 1100 and the location in which the data content corresponding to the region for the playback on the terminal 1100 is stored in the media segment, the location in which the data content is stored in the media segment.

Optionally, in another embodiment, the second acquiring unit 1160 is further configured to determine, according to the address for acquiring the media segment and the location in which the data content is stored in the media segment, an address, acquired from the MPD file, for acquiring the data content, where the address for acquiring the data content includes the address for acquiring the media segment and the location in which the data content is stored in the media segment, send the address for acquiring the data content to the server, and receive the data content that is sent by the server and corresponds to the address for acquiring the data content.

Optionally, in another embodiment, the first determining unit 1130 is further configured to present, to a user of the terminal 1100 according to the region information, the region that can be independently decoded, and determine, as the region for the playback on the terminal 1100, a region selected by the user from the region that can be independently decoded, or determine, as the region for the playback on the terminal 1100 according to the region information, a region that matches a capability of the terminal 1100 and is in the region that can be independently decoded.

Figure 12:
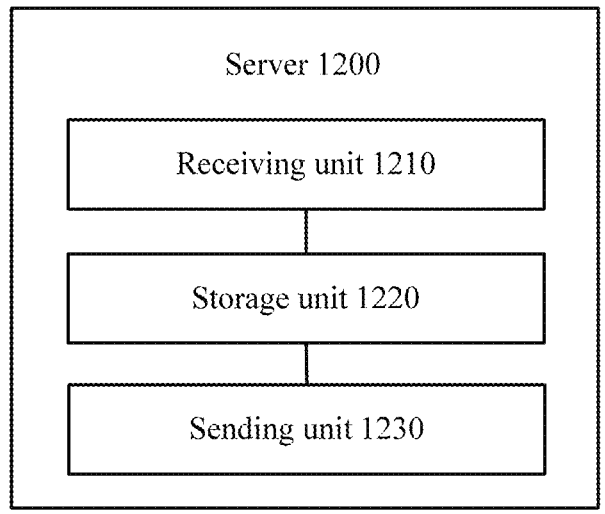
FIG. 12 is a schematic block diagram of a server according to an embodiment of the present disclosure.

FIG. 12 is a schematic block diagram of a server according to an embodiment of the present disclosure. The server 1200 in FIG. 12 includes a receiving unit 1210, a storage unit 1220, and a sending unit 1230. It should be noted that the server 1200 can implement steps performed by a server in FIG. 1 to FIG. 10, and to avoid repetition, a repeated description is omitted appropriately.

The receiving unit 1210 is configured to receive a request, sent by a terminal, for acquiring an MPD file of a video.

The storage unit 1220 is configured to store the MPD file of the video.

The sending unit 1230 is configured to send the MPD file, stored in the storage unit 1220, of the video to the terminal according to the request, sent by the terminal, for acquiring the MPD file of the video, where the MPD file includes region information of a region that can be independently decoded in the video.

The receiving unit 1210 is further configured to receive a location, sent by the terminal, in which data content corresponding to a region used for playback on the terminal is stored in the media segment of the video, where the region for the playback on the terminal is determined by the terminal according to the region information and from the region that can be independently decoded.

The storage unit 1220 is further configured to store media segments of the video.

The sending unit 1230 is further configured to send, to the terminal according to the location, received by the receiving unit 1210, in which the data content corresponding to the region for the playback on the terminal is stored in the media segment, the data content that is stored by the storage unit 1220 in the media segment and corresponds to the location in which the data content is stored in the media segment, where the data content corresponding to the region for the playback on the terminal is used for the terminal to play a picture of the region.

In this embodiment of the present disclosure, a location in which data content corresponding to a region for playback on a terminal is stored in a media segment is acquired, and the data content is downloaded according to the storage location and from content of the media segment stored in a server. Therefore, it is not required to independently store a partial video on the server, thereby saving a storage resource of the server.

Optionally, in an embodiment, the media segment includes at least two subsegments, the receiving unit 1210 is further configured to receive acquiring information sent by the terminal, where the acquiring information is used for acquiring a segment index and a subsample index of the media segment, the segment index is used to indicate a location in which each subsegment included in the media segment is stored in the media segment, the subsample index is used to indicate a location in which each subsample corresponding to the region that can be independently decoded is stored in each subsegment, and the location in which each subsample corresponding to the region that can be independently decoded is stored in each subsegment and the location in which each subsegment is stored in the media segment are used to determine the location in which the data content corresponding to the region for the playback on the terminal is stored in the media segment.

The storage unit 1220 is further configured to store the segment index and the subs ample index.

The sending unit 1230 is further configured to send the segment index and the subsample index to the terminal according to the acquiring information.

Figure 13:
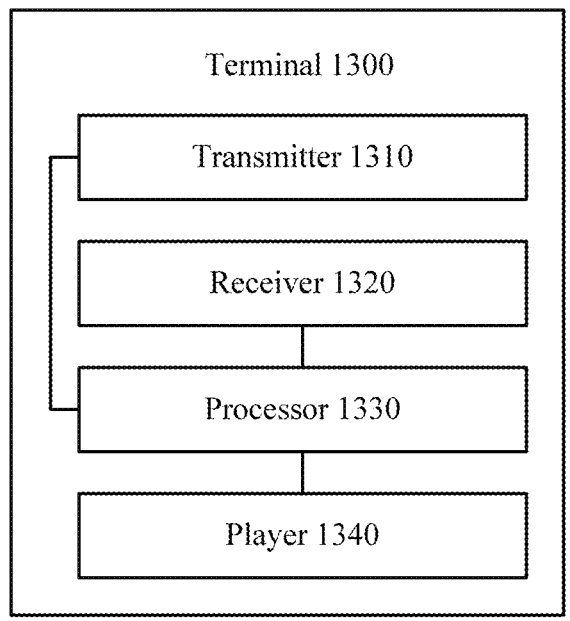
FIG. 13 is a schematic block diagram of a terminal according to an embodiment of the present disclosure.

FIG. 13 is a schematic block diagram of a terminal according to an embodiment of the present disclosure. The terminal 1300 in FIG. 13 includes a transmitter 1310, a receiver 1320, a processor 1330, and a player 1340. It should be noted that the terminal 1300 can implement steps performed by a terminal in FIG. 1 to FIG. 10, and to avoid repetition, a repeated description is omitted appropriately.

The transmitter 1310 is configured to send, to a server, a request for acquiring an MPD file of a video.

The receiver 1320 is configured to receive the MPD file sent by the server, where the MPD file includes region information of a region that can be independently decoded in the video.

The processor 1330 is configured to determine, according to the region information included in the MPD file received by the receiver 1320, a region used for playback on the terminal 1300 from the region that can be independently decoded, determine a to-be-acquired media segment according to the MPD file, acquire a location in which data content corresponding to the region for the playback on the terminal 1300 is stored in the media segment, where the data content is used for playing a picture of the region, and acquire, according to the location in which the data content corresponding to the region for the playback on the terminal 1300 is stored in the media segment, the data content corresponding to the region for the playback on the terminal 1300 from the media segment stored in the server.

The player 1340 is configured to play, according to the data content that is acquired by the processor 1330 and corresponds to the region for the playback on the terminal 1300, a picture of the region for the playback on the terminal 1300.

In this embodiment of the present disclosure, a location in which data content corresponding to a region for playback on a terminal is stored in a media segment is acquired, and the data content is acquired according to the storage location and from the media segment stored in a server. Therefore, it is not required to independently store a partial video on the server, thereby saving a storage resource of the server.

Optionally, in an embodiment, the media segment includes at least two subsegments, the processor 1330 is further configured to acquire, from the server, a segment index and a subsample index of the media segment, where the segment index is used to indicate a location in which each subsegment included in the media segment is stored in the media segment, and the subsample index is used to indicate a location in which each subsample corresponding to the region that can be independently decoded is stored in each subsegment, determine a to-be-acquired subsegment according to the segment index, and determine, according to a location in which the subsegment is stored in the media segment and a location in which a subsample corresponding to the region for the playback on the terminal 1300 in the region that can be independently decoded is stored in the subsegment, the location in which the data content corresponding to the region for the playback on the terminal 1300 is stored in the media segment.

Optionally, in another embodiment, the segment index and the subsample index are both located in a header of the media segment, and the subsample index is adjacent to the segment index, and the processor 1330 is further configured to acquire, according to an address for acquiring the media segment, the segment index and the subsample index that are located in the header of the media segment.

Optionally, in another embodiment, the media segment includes at least two sections, each section includes at least one subsegment, the segment index includes a first index and a second index, and a header of each section includes one second index and one subsample index adjacent to the second index. The first index is located in a header of the media segment and used to indicate a start location of each second index of the media segment in the media segment. The second index is used to indicate a location in which a subsegment of a section in which the second index is located is stored in the media segment, and the processor 1330 is further configured to acquire, according to an address for acquiring the media segment, the first index located in the header of the media segment, and acquire each second index and a subsample index adjacent to each second index according to the start location, indicated by the first index, of each second index in the media segment.

Optionally, in another embodiment, the MPD file includes a correspondence between an address for acquiring the media segment and an address for acquiring an index segment, the index segment is dedicatedly used to store the segment index and the subsample index of the media segment, and in the index segment, the sub sample index is adjacent to the segment index, and the processor 1330 is further configured to acquire, from the MPD file according to the correspondence between the address for acquiring the media segment and the address for acquiring the index segment, the address for acquiring the index segment corresponding to the address for acquiring the media segment, and acquire the segment index and the subsample index according to the address for acquiring the index segment.

Optionally, in another embodiment, the MPD file includes a correspondence between the region for the playback on the terminal 1300 and the location in which the data content corresponding to the region for the playback on the terminal 1300 is stored in the media segment, and the processor 1330 is further configured to acquire, from the MPD file according to the region for the playback on the terminal 1300 and the correspondence between the region for the playback on the terminal 1300 and the location in which the data content corresponding to the region for the playback on the terminal 1300 is stored in the media segment, the location in which the data content is stored in the media segment.

Optionally, in another embodiment, the processor 1330 is further configured to determine, according to the address for acquiring the media segment and the location in which the data content is stored in the media segment, an address, acquired from the MPD file, for acquiring the data content, where the address for acquiring the data content includes the address for acquiring the media segment and the location in which the data content is stored in the media segment, send the address for acquiring the data content to the server, and receive the data content that is sent by the server and corresponds to the address for acquiring the data content.

Optionally, in another embodiment, the processor 1330 is further configured to present, to a user of the terminal 1300 according to the region information, the region that can be independently decoded, and determine, as the region for the playback on the terminal 1300, a region selected by the user from the region that can be independently decoded, or determine, as the region for the playback on the terminal 1300 according to the region information, a region that matches a capability of the terminal 1300 and is in the region that can be independently decoded.

Figure 14:
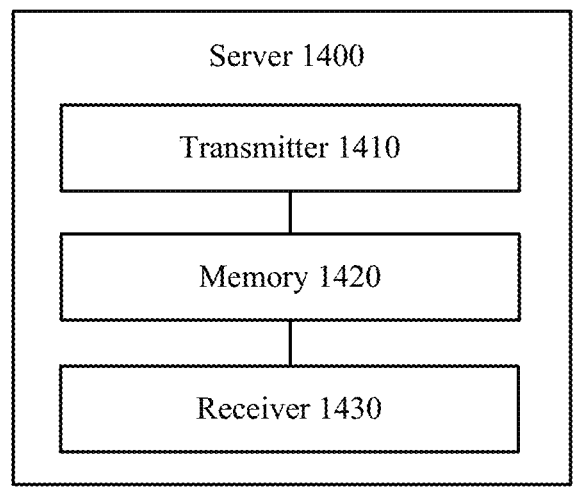
FIG. 14 is a schematic block diagram of a server according to an embodiment of the present disclosure.

FIG. 14 is a schematic block diagram of a server according to an embodiment of the present disclosure. The server 1400 in FIG. 14 includes a transmitter 1410, a receiver 1430, and a memory 1420. It should be noted that the server 1400 can implement steps performed by a server in FIG. 1 to FIG. 10, and to avoid repetition, a repeated description is omitted appropriately.

The transmitter 1410 is configured to send an MPD file of a video to a terminal according to a request, sent by the terminal, for acquiring the MPD file of the video, where the MPD file includes region information of a region that can be independently decoded in the video.

The receiver 1430 is configured to receive a location, sent by the terminal, in which data content corresponding to a region used for playback on the terminal is stored in the media segment of the video, where the region for the playback on the terminal is determined by the terminal according to the region information and from the region that can be independently decoded.

The memory 1420 is configured to store the MPD file of the video and media segments of the video.

The transmitter 1410 is further configured to send, to the terminal according to the location, received by the receiver 1430, in which the data content corresponding to the region for the playback on the terminal is stored in the media segment, the data content that is stored in the media segment and corresponds to the location in which the data content is stored in the media segment, where the data content corresponding to the region for the playback on the terminal is used for the terminal to play a picture of the region.

In this embodiment of the present disclosure, a location in which data content corresponding to a region for playback on a terminal is stored in a media segment is acquired, and the data content is downloaded according to the storage location and from content of the media segment stored in a server. Therefore, it is not required to independently store a partial video on the server, thereby saving a storage resource of the server.

Optionally, in an embodiment, the media segment includes at least two subsegments, and the receiver 1430 is further configured to receive acquiring information sent by the terminal, where the acquiring information is used for acquiring a segment index and a subsample index of the media segment, the segment index is used to indicate a location in which each subsegment included in the media segment is stored in the media segment, the subsample index is used to indicate a location in which each subsample corresponding to the region that can be independently decoded is stored in each subsegment, and the location in which each subsample corresponding to the region that can be independently decoded is stored in each subsegment and the location in which each subsegment is stored in the media segment are used to determine the location in which the data content corresponding to the region for the playback on the terminal is stored in the media segment, and send the segment index and the subsample index to the terminal according to the acquiring information.

The memory 1420 is further configured to store the segment index and the subsample index of the video.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video processing method, comprising:
sending, to a server, a request for acquiring a media presentation description (MPD) file of a video;
receiving the MPD file from the server, wherein the MPD file comprises region information of a region that can be independently decoded in the video;
determining, according to the region information, a region used for playback on a terminal from the region that can be independently decoded;
determining a to-be-acquired media segment according to the MPD file;
acquiring a location in which data content corresponding to the region for the playback on the terminal is stored in the media segment by:
acquiring, from the server, a segment index of the media segment, wherein the segment index indicates a location in which each subsegment comprised in the media segment is stored in the media segment, and wherein the segment index further comprises indicating information which is used to indicate a location of data content corresponding to the region that can be independently decoded in each subsegment;
determining a to-be-acquired subsegment according to the segment index; and
determining, according to a location in which the subsegment is stored in the media segment and the indicating information, the location in which the data content corresponding to the region for the playback on the terminal is stored in the media segment;
acquiring, according to the location in which the data content corresponding to the region for the playback on the terminal is stored in the media segment, the data content corresponding to the region for the playback on the terminal from the media segment stored in the server; and
playing, according to the data content corresponding to the region for the playback on the terminal, a picture of the region for the playback on the terminal, and wherein the media segment comprises at least two subsegments.

2. The method of claim 1, wherein the segment index is located in a header of the media segment.

3. The method of claim 1, wherein the MPD file comprises a correspondence between the region for the playback on the terminal and the location in which the data content corresponding to the region for the playback on the terminal is stored in the media segment, and wherein acquiring the location in which the data content corresponding to the region for the playback on the terminal is stored in the media segment comprises acquiring, from the MPD file according to the region for the playback on the terminal and the correspondence between the region for the playback on the terminal and the location in which the data content corresponding to the region for the playback on the terminal is stored in the media segment, the location in which the data content is stored in the media segment.

4. The method of claim 1, wherein acquiring, according to the location in which the data content corresponding to the region for the playback on the terminal is stored in the media segment, the data content corresponding to the region for the playback on the terminal from the media segment stored in the server comprises:
   determining, according to an address for acquiring the media segment and the location in which the data content is stored in the media segment, an address, acquired from the MPD file, for acquiring the data content, wherein the address for acquiring the data content comprises the address for acquiring the media segment and the location in which the data content is stored in the media segment;
   sending the address for acquiring the data content to the server; and
   receiving the data content from the server.

5. The method of claim 1, wherein determining, according to the region information, the region used for playback on the terminal from the region that can be independently decoded comprises:
   presenting, to a user of the terminal according to the region information, the region that can be independently decoded; and
   determining, as the region for the playback on the terminal, a region selected by the user from the region that can be independently decoded.

6. The method of claim 1, wherein the media segment comprises multiple sections, wherein each section comprises multiple regions that can be independently and separately decoded.

7. The method of claim 1, wherein the region information comprises a region index number of the region that can be independently decoded, a location parameter of the region that can be independently decoded in an entire video picture, a frame rate during playback of the region that can be independently decoded, and a transmission bandwidth of the region that can be independently decoded.

8. The method of claim 1, wherein a resolution of each region that can be independently decoded is recorded in the region information.

9. A video processing method, comprising:
   sending a media presentation description (MPD) file of a video to a terminal according to a request, from the terminal, for acquiring the MPD file of the video, wherein the MPD file comprises region information of a region that can be independently decoded in the video;

receiving acquiring information from the terminal, wherein the acquiring information is used for acquiring a segment index of the media segment, wherein the segment index indicates a location in which each subsegment comprised in the media segment is stored in the media segment, and wherein the segment index further comprises indicating information which is used to indicate a location of data content corresponding to the region that can be independently decoded in each subsegment;
sending the segment index to the terminal according to the acquiring information;
receiving a location, from the terminal, in which data content corresponding to a region used for playback on the terminal is stored in a media segment of the video, wherein the region for the playback on the terminal is determined by the terminal according to the region information and from the region that can be independently decoded; and
sending, to the terminal according to the location in which the data content corresponding to the region used for the playback on the terminal is stored in the media segment, data content that is stored in the media segment and that corresponds to the location in which the data content corresponding to the region used for playback is stored in the media segment, wherein the data content corresponding to the region used for the playback on the terminal is used for the terminal to play a picture of the region, and wherein the media segment comprises at least two subsegments.

10. A terminal, comprising:
a transmitter configured to send, to a server, a request for acquiring a media presentation description (MPD) file of a video;
a receiver configured to receive the MPD file from the server, wherein the MPD file comprises region information of a region that can be independently decoded in the video; and
a processor coupled to the transmitter and the receiver and configured to:
   determine, according to the region information comprised in the MPD file received by the receiver, a region used for playback on the terminal from the region that can be independently decoded;
   determine a to-be-acquired media segment according to the MPD file received by the receiver;
   acquire a location in which data content corresponding to the region for the playback on the terminal is stored in the to-be-acquired media segment, wherein the data content is used for playing a picture of the region;
   acquire, according to the location, the data content corresponding to the region for the playback on the terminal from the to-be-acquired media segment;
   play, according to the data content that corresponds to the region for the playback on the terminal, a picture of the region for the playback on the terminal, wherein the to-be-acquired media segment comprises at least two subsegments;
   acquire, from the server, a segment index of the to-be-acquired media segment, wherein the segment index indicates a location in which each subsegment comprised in the to-be-acquired media segment is stored in the to-be-acquired media segment, and wherein the segment index further comprises indicating information which is used to indicate a location of data content corresponding to the region that can be independently decoded in each subsegment;

determine a to-be-acquired subsegment according to the segment index; and determine, according to a location in which the subsegment is stored in the media segment and a location in which a subsample corresponding to the region for the playback on the terminal in the region that can be independently decoded is stored in the subsegment, the location in which the data content corresponding to the region for the playback on the terminal is stored in the media segment.

11. The terminal of claim 10, wherein the segment index is located in a header of the media segment.

12. The terminal of claim 10, wherein the MPD file comprises a correspondence between the region for the playback on the terminal and the location in which the data content corresponding to the region for the playback on the terminal is stored in the media segment, and the processor is further configured to acquire, from the MPD file according to the region for the playback on the terminal and the correspondence between the region for the playback on the terminal and the location in which the data content corresponding to the region for the playback on the terminal is stored in the media segment, the location in which the data content is stored in the media segment.

13. The terminal of claim 10, wherein the processor is further configured to:

determine, according to an address for acquiring the media segment and the location in which the data content is stored in the media segment, an address, acquired from the MPD file, for acquiring the data content, the address for acquiring the data content comprising the address for acquiring the media segment and the location in which the data content is stored in the media segment;

send the address for acquiring the data content to the server; and receive the data content that is from the server and corresponds to the address for acquiring the data content.

14. The terminal of claim 10, wherein the processor is further configured to:

present, to a user of the terminal according to the region information, the region that can be independently decoded; and determine, as the region for the playback on the terminal, a region selected by the user from the region that can be independently decoded.

15. The terminal of claim 10, wherein the media segment comprises multiple sections, wherein each section comprises multiple regions that can be independently and separately decoded.

16. The terminal of claim 10, wherein the region information comprises a region index number of the region that can be independently decoded, a location parameter of the region that can be independently decoded in an entire video picture, a frame rate during playback of the region that can be independently decoded, and a transmission bandwidth of the region that can be independently decoded.

17. The terminal of claim 10, wherein a resolution of each region that can be independently decoded is recorded in the region information.

18. The video processing method of claim 1, wherein the region that can be independently decoded in the video comprises motion constrained tile sets (MCTS).

19. The video processing method of claim 9, wherein the region that can be independently decoded in the video comprises motion constrained tile sets (MCTS).

20. The terminal of claim 10, wherein the region that can be independently decoded in the video comprises motion constrained tile sets (MCTS).

* * * * *